United States Patent
Suzuki et al.

(10) Patent No.: US 10,708,005 B2
(45) Date of Patent: Jul. 7, 2020

(54) TERMINAL DEVICE, BASE STATION DEVICE, INTEGRATED CIRCUIT, AND COMMUNICATION METHOD

(71) Applicant: Sharp Kabushiki Kaisha, Sakai, Osaka (JP)

(72) Inventors: Shoichi Suzuki, Sakai (JP); Tatsushi Aiba, Sakai (JP); Kazunari Yokomakura, Sakai (JP); Hiroki Takahashi, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/568,787

(22) PCT Filed: Apr. 8, 2016

(86) PCT No.: PCT/JP2016/061525
§ 371 (c)(1),
(2) Date: Oct. 23, 2017

(87) PCT Pub. No.: WO2016/171010
PCT Pub. Date: Oct. 27, 2016

(65) Prior Publication Data
US 2018/0278378 A1    Sep. 27, 2018

(30) Foreign Application Priority Data
Apr. 24, 2015    (JP) .................... 2015-089379

(51) Int. Cl.
*H04L 1/18* (2006.01)
*H04W 74/08* (2009.01)
(Continued)

(52) U.S. Cl.
CPC .......... *H04L 1/1861* (2013.01); *H04L 1/1812* (2013.01); *H04L 1/1822* (2013.01);
(Continued)

(58) Field of Classification Search
CPC .... H04L 1/1812; H04L 1/1822; H04L 1/1896
See application file for complete search history.

(56) References Cited

U.S. PATENT DOCUMENTS 9,942,412 B1 * 4/2018 Oroskar ............ H04W 74/0833
2009/0262681 A1 * 10/2009 Park .................. H04W 74/0841
370/328

(Continued)

FOREIGN PATENT DOCUMENTS

EP    2264936 A2    12/2010

OTHER PUBLICATIONS

Author Unknown, Impacts of asynchronous UL HARQ in LAA, Doc. No. R2-151505, Apr. 10, 2015, pp. 1-4 (Year: 2015).*
(Continued)

*Primary Examiner* — Christopher M Crutchfield
(74) *Attorney, Agent, or Firm* — ScienBiziP, P.C.

(57) ABSTRACT

Provided is a terminal device that receives RRC layer information indicating an asynchronous HARQ for a secondary cell, and a first random access response, which is a random access response including fields for indicating an uplink grant and a Temporary C-RNTI and is related to a non-contention based random access procedure on the secondary cell, that manages multiple HARQ processes, and that delivers the uplink grant to an HARQ process that instructs the transmission unit to transmit the MAC layer data in accordance with the uplink grant. In a case that the RRC layer information indicating the asynchronous HARQ is configured, a HARQ process in which the uplink grant included in the first random access response is delivered is determined based on the value of a field for indicating the Temporary C-RNTI included in the first random access response.

6 Claims, 17 Drawing Sheets

(51) Int. Cl.
*H04W 72/14* (2009.01)
*H04L 1/16* (2006.01)

(52) U.S. Cl.
CPC .......... *H04L 1/1896* (2013.01); *H04W 72/14* (2013.01); *H04W 74/0833* (2013.01); *H04L 1/1671* (2013.01)

(56) References Cited

U.S. PATENT DOCUMENTS

| | | | | |
|---|---|---|---|---|
| 2009/0287976 | A1* | 11/2009 | Wang | H04L 1/1812 714/748 |
| 2010/0074204 | A1* | 3/2010 | Meylan | H04L 1/1822 370/329 |
| 2010/0081443 | A1* | 4/2010 | Meyer | H04L 1/1812 455/450 |
| 2010/0322172 | A1* | 12/2010 | Hsu | H04L 1/1822 370/329 |
| 2014/0328332 | A1* | 11/2014 | Yang | H04W 72/14 370/336 |

OTHER PUBLICATIONS

3rd Generation Partnership Project Technical Specification 3GPP TS 36.300 v12.4.0 (Dec. 2014) "Evolved Universal Terrestrial Radio Access (EUTRA) and Evolved Universal Terrestrial Radio Access Network (E-UTRAN)"; Overall description; Stage 2 (Release 12).

Source: NVIDIA; Title: "UL HARQ considerations for LTE LAA", R2-151551, NVIDIA, 3GPP TSG RAN WG2 Meeting #89bis, Bratislava, Slovakia, Apr. 20-24, 2015.

ZTE: "Control signalling and HARQ related issues for Licensed-assisted access using LTE", R1-151810, 3GPP TSG RAN WG1 Meeting #80bis, Belgrade, Serbia, Apr. 20-24, 2015.

Samsung: "Discussion on UL transmission for LAA", R1-151627, 3GPP TSG RAN WG1 Meeting #80bis, Belgrade, Serbia, Apr. 20-24, 2015.

* cited by examiner

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

| UL-DL CONFIGURATION | NUMBER OF HARQ PROCESSES | NUMBER OF BITS OF INFORMATION INDICATING HARQ PROCESS NUMBER |
|---|---|---|
| 0 | 7 | 3 |
| 1 | 4 | 2 |
| 2 | 2 | 1 |
| 3 | 3 | 2 |
| 4 | 2 | 1 |
| 5 | 1 | 0 |
| 6 | 6 | 3 |

FIG. 8

| TDD or FDD | SYNCHRONOUS HARQ or ASYNCHRONOUS HARQ | UL-DL CONFIGURATION | NUMBER OF HARQ PROCESSES | NUMBER OF BITS OF INFORMATION INDICATING HARQ PROCESS NUMBER |
|---|---|---|---|---|
| TDD | SYNCHRONOUS HARQ | 0 | 7 | 0 |
| | | 1 | 4 | 0 |
| | | 2 | 2 | 0 |
| | | 3 | 3 | 0 |
| | | 4 | 2 | 0 |
| | | 5 | 1 | 0 |
| | | 6 | 6 | 0 |
| | ASYNCHRONOUS HARQ | 0,1,2,3,4,5,6 | 8 | 3 |

FIG. 9

(a) extended MAC RAR in case that F field is set to 0

(b) extended MAC RAR in case that F field is set to 1

TERMINAL DEVICE, BASE STATION DEVICE, INTEGRATED CIRCUIT, AND COMMUNICATION METHOD

TECHNICAL FIELD

The present invention relates to a terminal device, a base station device, an integrated circuit, and a communication method.

This application claims priority based on JP 2015-089379 filed on Apr. 24, 2015, the contents of which are incorporated herein by reference.

BACKGROUND ART

In the 3rd Generation Partnership Project (3GPP), a radio access method and a radio network for the cellular mobile communication (hereinafter referred to as "Long Term Evolution (LTE)", "Evolved Universal Terrestrial Radio Access (EUTRA)", or "Evolved Universal Terrestrial Radio Access Network (EUTRAN)") have been studied. In LTE, a base station device is also referred to as an evolved NodeB (eNodeB), and a terminal device is also referred to as user equipment (UE). LTE is a cellular communication system in which multiple areas each covered by the base station device are deployed to form a cellular structure. A single base station device may manage multiple cells.

LTE supports a time division duplex (TDD). LTE that employs the TDD scheme is also referred to as TD-LTE or LTE TDD. In TDD, uplink signals and downlink signals are time division multiplexed. Furthermore, LTE supports a frequency division duplex (FDD).

LTE provides a Hybrid Automatic Repeat reQuest (HARQ) functionality at Medium Access Control (MAC) layers. The HARQ functionality in the downlink has an asynchronous adaptive HARQ characteristic, and the HARQ functionality in the uplink has a synchronous HARQ characteristic (NPL 1). Introduction of the asynchronous HARQ in the uplink has been studied in the 3GPP (NPL 2).

CITATION LIST

Non-Patent Document

[NON-PATENT DOCUMENT 1] "3GPP TS 36.300 v12.4.0 Evolved Universal Terrestrial Radio Access (E-UTRA) and Evolved Universal Terrestrial Radio Access Network (E-UTRAN); Overall description; Stage 2", 7 Nov. 2015.
[NON-PATENT DOCUMENT 2] "UL HARQ considerations for LTE LAA", R2-151551, NVIDIA, 3GPP TSG RAN WG2 Meeting #89bis, 20-24 Apr. 2015.

DISCLOSURE OF THE INVENTION

Problems to be Solved by the Invention

However, a concrete method for introducing an asynchronous HARQ in the uplink has not been fully studied. For instance, a method for switching between a synchronous HARQ and the asynchronous HARQ in the uplink has not been fully studied. Further, for instance, a method for identifying a HARQ process related to an uplink grant has not been fully studied. Moreover, for instance, a method for processing a HARQ buffer has not been fully studied.

The present invention provides a terminal device capable of efficiently communicating with a base station device, an integrated circuit mounted on the terminal device, a communication method used by the terminal device, the base station device communicating with the terminal device, an integrated circuit mounted on the base station device, and a communication method used by the base station device.

Means for Solving the Problems (1) The aspects of the present invention are contrived to provide the following means. Specifically, a first aspect of the present invention is a terminal device including: a reception unit configured to receive RRC layer information and a first random access response, the RRC layer information indicating an asynchronous HARQ for a secondary cell, and the first random access response being a random access response including fields for indicating an uplink grant and a Temporary C-RNTI and being related to a non-contention based random access procedure on the secondary cell; a transmission unit configured to transmit MAC layer data; and a MAC layer processing unit configured to manage multiple HARQ processes and deliver the uplink grant to a HARQ process that instruct the transmission unit to transmit the MAC layer data in accordance with the uplink grant. In a case that the RRC layer information indicating the asynchronous HARQ is configured, a HARQ process in which the uplink grant included in the first random access response is delivered is determined based on a value of a field for indicating the Temporary C-RNTI included in the first random access response.

(2) Moreover, a second aspect of the present invention is a terminal device including: a reception unit configured to receive RRC layer information indicating an asynchronous HARQ; a transmission unit configured to transmit MAC layer data; and a MAC layer processing unit configured to deliver an uplink grant to an HARQ process that instructs the transmission unit to transmit the MAC layer data in accordance with the uplink grant. Regardless of whether or not the RRC layer information indicating the asynchronous HARQ is configured, a HARQ process in which the uplink grant received on a physical downlink control channel including CRC parity bits scrambled with a Temporary C-RNTI is delivered is determined based on a subframe in which the uplink grant has been received on the physical downlink control channel including the CRC parity bits scrambled with the Temporary C-RNTI, and whether the HARQ process in which the uplink grant received on a physical downlink control channel including CRC parity bits scrambled with a C-RNTI is delivered is determined based on the HARQ information received on the physical downlink control channel including the CRC parity bits scrambled with the C-RNTI or a subframe in which the uplink grant has been received on the physical downlink control channel including the CRC parity bits scrambled with the C-RNTI depends on whether or not the RRC layer information indicating the asynchronous HARQ is configured.

(3) Moreover, a third aspect of the present invention is a terminal device including: a reception unit configured to receive an uplink grant on a physical downlink control channel including CRC parity bits scrambled with a C-RNTI; a transmission unit configured to transmit MAC layer data; and a MAC layer processing unit configured to deliver the uplink grant to an HARQ process that instructs the transmission unit to transmit the MAC layer data in accordance with the uplink grant. Regardless of whether or not RRC layer information indicating an asynchronous HARQ is configured, a HARQ process in which the uplink grant received on the physical downlink control channel in a first search space is delivered is determined based on a subframe in which the uplink grant has been received on the physical downlink control channel in the first search space, and whether a HARQ process in which the uplink grant received on the physical downlink control channel in a second search space is delivered is determined based on HARQ information received on the physical downlink control channel in the second search space or a subframe in which the uplink grant has been received on the physical downlink control channel in the second search space depends on whether or not the RRC layer information indicating the asynchronous HARQ is configured.

(4) Moreover, a fourth aspect of the present invention is a base station device including: a transmission unit configured to transmit RRC layer information and a first random access response, the RRC layer information indicating an asynchronous HARQ for a secondary cell, and the first random access response being a random access response including fields for indicating an uplink grant and a Temporary C-RNTI and being related to a non-contention based random access procedure on the secondary cell; a reception unit configured to receive MAC layer data; and a MAC layer processing unit configured to manage multiple HARQ processes. In a case that the RRC layer information indicating the asynchronous HARQ is configured in a terminal device, a value of a field for indicating the Temporary C-RNTI included in the first random access response indicates a HARQ process for the uplink grant included in the first random access response.

(5) Moreover, a fifth aspect of the present invention is a base station device including: a transmission unit configured to transmit RRC layer information indicating an asynchronous HARQ and an uplink grant; a reception unit configured to receive MAC layer data; and a MAC layer processing unit configured to deliver the uplink grant to an HARQ process that instructs the transmission unit to transmit the MAC layer data in accordance with to the uplink grant. Regardless of whether or not the RRC layer information indicating the asynchronous HARQ is configured in a terminal device, a HARQ process for the uplink grant transmitted on a physical downlink control channel including CRC parity bits scrambled with a Temporary C-RNTI is associated with a subframe in which the uplink grant has been transmitted on the physical downlink control channel including the CRC parity bits scrambled with the Temporary C-RNTI, and whether a HARQ process in which the uplink grant transmitted on a physical downlink control channel including CRC parity bits scrambled with a C-RNTI is delivered is indicated by HARQ information transmitted on the physical downlink control channel including the CRC parity bits scrambled with the C-RNTI or is associated with a subframe in which the uplink grant has been transmitted on the physical downlink control channel including the CRC parity bits scrambled with the C-RNTI depends on whether or not the RRC layer information indicating the asynchronous HARQ is configured in the terminal device.

(6) Moreover, a sixth aspect of the present invention is a base station device including: a transmission unit configured to transmit an uplink grant on a physical downlink control channel including CRC parity bits scrambled with a C-RNTI; a reception unit configured to receive MAC layer data; and a MAC layer processing unit configured to manage multiple HARQ processes. Regardless of whether or not RRC layer information indicating an asynchronous HARQ is configured in a terminal device, a HARQ process for the uplink grant transmitted on the physical downlink control channel in a first search space is associated with a subframe in which the uplink grant has been transmitted on the physical downlink control channel in the first search space, and whether a HARQ process for the uplink grant transmitted on the physical downlink control channel in a second search space is indicated by HARQ information transmitted on the physical downlink control channel in the second search space or is associated with a subframe in which the uplink grant has been transmitted on the physical downlink control channel in the second search space depends on whether or not the RRC layer information indicating the asynchronous HARQ is configured in the terminal device.

(7) Moreover, a seventh aspect of the present invention is a communication method used in a terminal device, the communication method including the steps of: receiving RRC layer information and a first random access response, the RRC layer information indicating an asynchronous HARQ for a secondary cell, and the first random access response being a random access response including fields for indicating an uplink grant and a Temporary C-RNTI and being related to a non-contention based random access procedure on the secondary cell; transmitting MAC layer data; and managing multiple HARQ processes and delivering the uplink grant to a HARQ process that instructs a transmission unit to transmit the MAC layer data in accordance with the uplink grant. In a case that the RRC layer information indicating the asynchronous HARQ is configured, a HARQ process in which the uplink grant included in the first random access response is delivered is determined based on a value of a field for indicating the Temporary C-RNTI included in the first random access response.

(8) Moreover, an eighth aspect of the present invention is a communication method used in a terminal device, the communication method including the steps of: receiving RRC layer information indicating an asynchronous HARQ; transmitting MAC layer data; and delivering an uplink grant to an HARQ process that instructs transmission of the MAC layer data in accordance with the uplink grant. Regardless of whether or not the RRC layer information indicating the asynchronous HARQ is configured, a HARQ process in which the uplink grant received on a physical downlink control channel including CRC parity bits scrambled with a Temporary C-RNTI is delivered is determined based on a subframe in which the uplink grant has been received on the physical downlink control channel including the CRC parity bits scrambled with the temporary C-RNTI, and whether a HARQ process in which the uplink grant received on a physical downlink control channel including CRC parity bits scrambled with a C-RNTI is delivered is determined based on HARQ information received on the physical downlink control channel including the CRC parity bits scrambled with the C-RNTI or a subframe in which the uplink grant has been received on the physical downlink control channel including the CRC parity bits scrambled with the C-RNTI depends on whether or not the RRC layer information indicating the asynchronous HARQ is configured.

(9) Moreover, a ninth aspect of the present invention is a communication method used in a terminal device, the communication method including the steps of: receiving an uplink grant on a physical downlink control channel including CRC parity bits scrambled with a C-RNTI; transmitting MAC layer data; and delivering the uplink grant to an HARQ process that instructs transmission of the MAC layer data in accordance with the uplink grant. Regardless of whether or not RRC layer information indicating an asynchronous HARQ is configured, a HARQ process in which the uplink grant received on the physical downlink control channel in a first search space is delivered is determined based on a subframe in which the uplink grant has been received on the physical downlink control channel in the first search space, and whether a HARQ process in which the uplink grant received on the physical downlink control channel in a second search space is delivered is determined based on HARQ information received on the physical downlink control channel in the second search space or a subframe in which the uplink grant has been received on the physical downlink control channel in the second search space depends on whether or not the RRC layer information indicating the asynchronous HARQ is configured.

(10) Moreover, a tenth aspect of the present invention is a communication method used in a base station device, the communication method including the steps of: transmitting RRC layer information and a first random access response, the RRC layer information indicating an asynchronous HARQ for a secondary cell, and the first random access response being a random access response including fields for indicating an uplink grant and a Temporary C-RNTI and being related to a non-contention based random access procedure on the secondary cell; receiving MAC layer data; and managing multiple HARQ processes. In a case that the RRC layer information indicating the asynchronous HARQ is configured in a terminal device, a value of a field for indicating the Temporary C-RNTI included in the first random access response indicates a HARQ process for the uplink grant included in the first random access response.

(11) Moreover, an eleventh aspect of the present invention is a communication method used in a base station device, the communication method including the steps of: transmitting RRC layer information indicating an asynchronous HARQ and an uplink grant; receiving MAC layer data; and delivering the uplink grant to an HARQ process that instructs transmission of the MAC layer data in accordance with the uplink grant. Regardless of whether or not the RRC layer information indicating the asynchronous HARQ is configured in a terminal device, a HARQ process for the uplink grant transmitted on a physical downlink control channel including CRC parity bits scrambled with a Temporary C-RNTI is associated with a subframe in which the uplink grant has been transmitted on the physical downlink control channel including the CRC parity bits scrambled with the temporary C-RNTI, and whether a HARQ process in which the uplink grant transmitted on a physical downlink control channel including CRC parity bits scrambled with a C-RNTI is delivered is indicated by HARQ information transmitted on the physical downlink control channel including the CRC parity bits scrambled with the C-RNTI or is associated with a subframe in which the uplink grant has been transmitted on the physical downlink control channel including the CRC parity bits scrambled with the C-RNTI depends on whether or not the RRC layer information indicating the asynchronous HARQ is configured in the terminal device.

(12) Moreover, a twelfth aspect of the present invention is a communication method used in a base station device, the communication method including the steps of: transmitting an uplink grant on a physical downlink control channel including CRC parity bits scrambled with a C-RNTI; receiving MAC layer data; and managing multiple HARQ processes. Regardless of whether or not RRC layer information indicating an asynchronous HARQ is configured in a terminal device, a HARQ process for the uplink grant transmitted on the physical downlink control channel in a first search space is associated with a subframe in which the uplink grant has been transmitted on the physical downlink control channel in the first search space, and whether a HARQ process for the uplink grant transmitted on the physical downlink control channel in a second search space is indicated by HARQ information transmitted on the physical downlink control channel in the second search space or is associated with a subframe in which the uplink grant has been transmitted on the physical downlink control channel in the second search space depends on whether or not the RRC layer information indicating the asynchronous HARQ is configured in the terminal device.

(13) A thirteenth aspect of the present invention is an integrated circuit mounted on a terminal device, the integrated circuit causing the terminal device to perform a series of functions of: receiving RRC layer information and a first random access response, the RRC layer information indicating an asynchronous HARQ for a secondary cell, and the first random access response being a random access response including fields for indicating an uplink grant and a Temporary C-RNTI and being related to a non-contention based random access procedure in the secondary cell; transmitting MAC layer data; and managing multiple HARQ processes and delivering the uplink grant to the HARQ processes that instruct the function of transmitting to transmit the MAC layer data in accordance with the uplink grant. In a case that the RRC layer information indicating the asynchronous HARQ is configured, a HARQ process in which the uplink grant included in the first random access response is delivered is determined based on a value of a field for indicating the Temporary C-RNTI included in the first random access response.

(14) Moreover, a fourteenth aspect of the present invention is an integrated circuit mounted on a terminal device, the integrated circuit causing the terminal device to perform a series of functions of receiving RRC layer information indicating an asynchronous HARQ; transmitting MAC layer data; and delivering an uplink grant to an HARQ process that instructs the function of transmitting to transmit the MAC layer data in accordance with the uplink grant. Regardless of whether or not RRC layer information indicating the asynchronous HARQ is configured, a HARQ process in which the uplink grant received on a physical downlink control channel including CRC parity bits scrambled with a Temporary C-RNTI is delivered is determined based on a subframe in which the uplink grant has been received on the physical downlink control channel including the CRC parity bits scrambled with the Temporary C-RNTI, and whether a HARQ process in which the uplink grant received on a physical downlink control channel including CRC parity bits scrambled with a C-RNTI is delivered is determined based on HARQ information received on the physical downlink control channel including the CRC parity bits scrambled with the C-RNTI or a subframe in which the uplink grant has been received on the physical downlink control channel including the CRC parity bits scrambled with the C-RNTI depends on whether or not the RRC layer information indicating the asynchronous HARQ is configured.

(15) A fifteenth aspect of the present invention is an integrated circuit mounted on a terminal device, the integrated circuit causing the terminal device to perform a series of functions of: receiving an uplink grant on a physical downlink control channel including CRC parity bits scrambled with a C-RNTI; transmitting MAC layer data; and delivering the uplink grant to a HARQ process that instructs the function of transmitting to transmit the MAC layer data in accordance with the uplink grant. Regardless of whether or not RRC layer information indicating an asynchronous HARQ is configured, an HARQ process in which the uplink grant received on the physical downlink control channel in a first search space is delivered is determined based on a subframe in which the uplink grant has been received on the physical downlink control channel in the first search space, and whether a HARQ process in which the uplink grant received on the physical downlink control channel in a second search space is delivered is determined based on HARQ information received on the physical downlink control channel in the second search space or a subframe in which the uplink grant has been received on the physical downlink control channel in the second search space depends on whether or not the RRC layer information indicating the asynchronous HARQ is configured.

(16) Moreover, a sixteenth aspect of the present invention is an integrated circuit mounted on a base station device, the integrated circuit causing a terminal device to perform a series of functions of: transmitting RRC layer information and a first random access response, the RRC layer information indicating an asynchronous HARQ for a secondary cell, and the first random access response being a random access response including fields for indicating an uplink grant and a Temporary C-RNTI and being related to a non-contention based random access procedure on the secondary cell; receiving MAC layer data; and managing multiple HARQ processes. In a case that the RRC layer information indicating the asynchronous HARQ is configured in the terminal device, a value of a field for indicating the Temporary C-RNTI included in the first random access response indicates a HARQ process for the uplink grant included in the first random access response.

(17) Moreover, a seventeenth aspect of the present invention is an integrated circuit mounted on a base station device, the integrated circuit causing a terminal device to perform a series of functions including: transmitting RRC layer information indicating an asynchronous HARQ and an uplink grant; receiving MAC layer data; and delivering the uplink grant to an HARQ process that instructs the function of transmitting to transmit the MAC layer data in accordance with to the uplink grant. Regardless of whether or not the RRC layer information indicating the asynchronous HARQ is configured in the terminal device, a HARQ process for the uplink grant transmitted on a physical downlink control channel including CRC parity bits scrambled with a Temporary C-RNTI is associated with a subframe in which the uplink grant has been transmitted on the physical downlink control channel including the CRC parity bits scrambled with the temporary C-RNTI, and whether a HARQ process in which the uplink grant transmitted on a physical downlink control channel including CRC parity bits scrambled with a C-RNTI is delivered is indicated by HARQ information transmitted on the physical downlink control channel including the CRC parity bits scrambled with the C-RNTI or is associated with a subframe in which the uplink grant has been transmitted on the physical downlink control channel including the CRC parity bits scrambled with the C-RNTI depends on whether or not the RRC layer information indicating the asynchronous HARQ is configured in the terminal device.

(18) An eighteenth aspect of the present invention is an integrated circuit mounted on a base station device, the integrated circuit causing a terminal device to perform a series of functions including: transmitting uplink grant on a physical downlink control channel including CRC parity bits scramble with a C-RNTI; receiving MAC layer data; and managing multiple HARQ processes. Regardless of whether or not RRC layer information indicating an asynchronous HARQ is configured in the terminal device, a HARQ process for the uplink grant transmitted on the physical downlink control channel in a first search space is associated with a subframe in which the uplink grant has been received on the physical downlink control channel in the first search space, and whether a HARQ process for the uplink grant transmitted on the physical downlink control channel in a second search space is indicated by HARQ information transmitted on the physical downlink control channel in the second search space or is associated with a subframe in which the uplink grant has been transmitted on the physical downlink control channel in the second search space depends on whether or not the RRC layer information indicating the asynchronous HARQ is configured in the terminal device.

Effects of the Invention

According to the present invention, the terminal device can efficiently communicate with the base station device.

BRIEF DESCRIPTION OF THE DRAWINGS

FIG. 5 is a table showing an example of a UL-DL configuration according to the present embodiment.

FIG. 8 is a table showing an example of the maximum number of HARQ processes which a HARQ entity corresponding to a TDD serving cell manages simultaneously according to the present embodiment.

FIG. 9 is a table showing another example of the maximum number of the HARQ processes which a HARQ entity corresponding to a TDD serving cell manages simultaneously according to the present embodiment.

MODE FOR CARRYING OUT THE INVENTION

Embodiments of the present invention will be described below.

Figure 1:
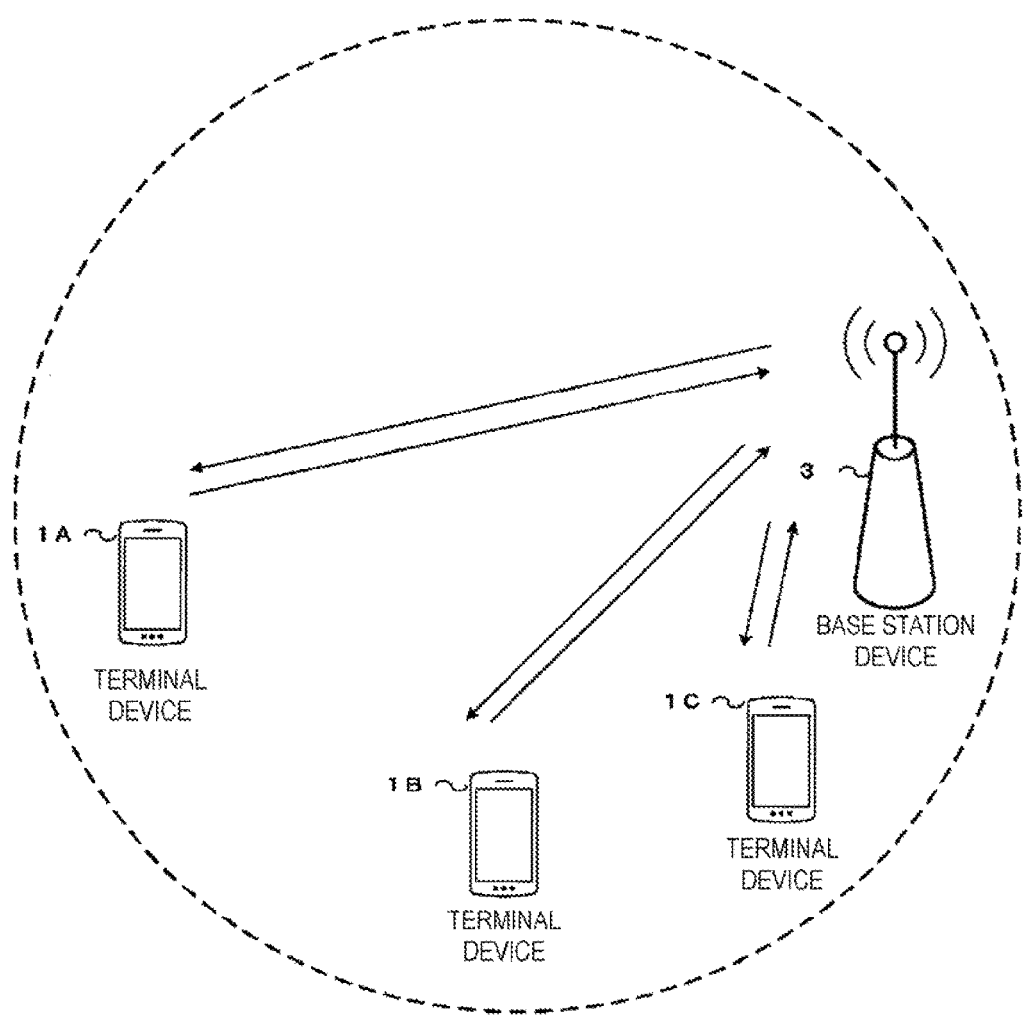
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. The terminal devices 1A to 1C are collectively referred to as a terminal device 1 below.

Carrier aggregation will be described below.

In the present embodiment, multiple serving cells are configured for the terminal device 1. A technology in which the terminal device 1 communicates via the multiple serving cells is referred to as cell aggregation or carrier aggregation. The present invention may be applied to each of the multiple serving cells configured for the terminal device 1. Furthermore, the present invention may be applied to some of the multiple configured serving cells. Furthermore, the present invention may be applied to each of groups of the multiple configured serving cells. Furthermore, the present invention may be applied to some of the groups of the multiple configured serving cells. In carrier aggregation, the multiple configured serving cells are also referred to as aggregated serving cells.

Time Division Duplex (TDD) and/or Frequency Division Duplex (FDD) is applied to a radio communication system according to the present embodiment. For cell aggregation, the FDD may be applied to all of the multiple serving cells. For the cell aggregation, the TDD may be applied to all of the multiple serving cells. Alternatively, serving cells to which the TDD is applied and serving cells to which the FDD is applied may be aggregated.

The multiple configured serving cells include one primary cell and one or multiple secondary cells. The primary cell is a cell in which an initial connection establishment procedure is executed, a cell in which a connection re-establishment procedure is initiated, or a cell indicated as a primary cell in a handover procedure. Secondary cells may be configured/added at a point in time of or after the establishment of a Radio Resource Control (RRC) connection.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. In the FDD, the uplink component carrier and the downlink component carrier individually correspond to different carrier frequencies. In the TDD, the uplink component carrier and the downlink component carrier correspond to the same carrier frequency.

The terminal device 1 can perform simultaneous transmission and/or reception on multiple physical channels on multiple serving cells (component carriers). A single physical channel is transmitted on a single serving cell (component carrier) of the multiple serving cells (component carriers).

Figure 2:
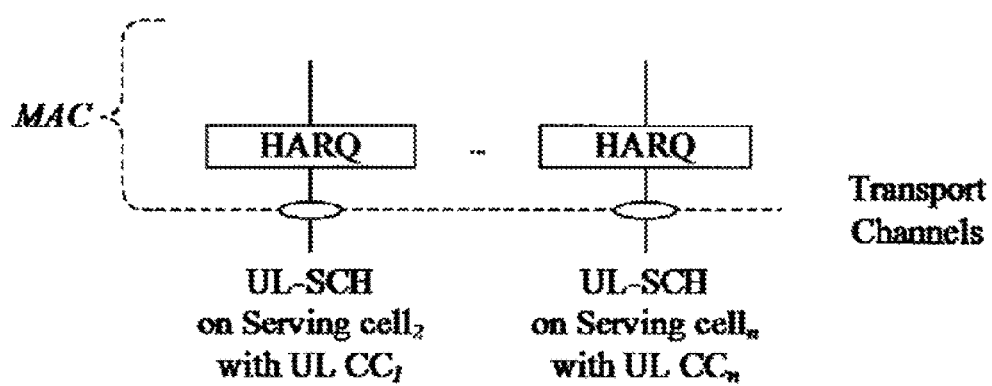
FIG. 2 is a diagram illustrating an example of a MAC layer structure in an uplink in which a carrier aggregation scheme is configured according to the present embodiment.

FIG. 2 illustrates an example of a Medium Access Control (MAC) layer structure in the uplink for which the carrier aggregation according to the present embodiment has been configured. In the uplink for which the carrier aggregation has been configured, one independent HARQ entity is present for each serving cell (uplink component carrier). The HARQ entity manages multiple HARQ processes simultaneously. The HARQ process relates to a HARQ buffer. Accordingly, the HARQ entity relates to multiple HARQ buffers. In the HARQ process, MAC layer data is stored in the HARQ buffer. In the HARQ process, a physical layer is instructed to transmit the MAC layer data.

In the uplink for which the carrier aggregation has been configured, at least one transport block is created every Transmission Time Interval (TTI) per serving cell. Each transport block and corresponding HARQ retransmissions are mapped to a serving cell. In LTE, TTI is a subframe. The transport block corresponds to the MAC layer data transmitted on an uplink shared channel (UL-SCH).

In the uplink according to the present embodiment, a "transport block", a "MAC Protocol Data Unit (PDU)", "MAC layer data", a "UL-SCH", "UL-SCH data", and "uplink data" denote the same constituent element.

Physical channels and physical signals according to the present embodiment will be described below.

The uplink radio communication from the terminal device 1 to the base station device 3 uses the following uplink physical channels. The uplink physical channels are used for transmissions of information output from a higher layer.

Physical Uplink Control Channel (PUCCH)
Physical Uplink Shared Channel (PUSCH)
Physical Random Access Channel (PRACH)

The PUCCH is used for uplink control information (UCI) transmissions. The uplink control information includes downlink channel state information (CSI), a scheduling request (SR) used to request a PUSCH (Uplink-Shared Channel (UL-SCH)) resource for the initial transmission, and Hybrid Automatic Repeat request ACKnowledgement (HARQ-ACK) corresponding to the downlink data (Transport Block, a MAC Protocol Data Unit (MAC PDU), a Downlink-Shared Channel (DL-SCH), and a Physical Downlink Shared Channel (PDSCH)). The HARQ-ACK indicates an acknowledgement (ACK) or a negative-acknowledgement (NACK). The HARQ-ACK is also referred to as an ACK/NACK, HARQ feedback, a HARQ response, or HARQ control information.

The scheduling request includes a positive scheduling request or a negative scheduling request. The positive scheduling request indicates a request for a UL-SCH resource for the initial transmission. The negative scheduling request indicates no request for a UL-SCH resource for the initial transmission.

The PUSCH is used for transmit uplink data (Uplink-Shared Channel (UL-SCH)) transmission. Furthermore, the PUSCH may be used for transmissions of the HARQ-ACK and/or channel state information along with the uplink data. Further, the PUSCH may be used only for the channel state information transmission. Moreover, the PUSCH may be used only for the transmission of the HARQ-ACK and channel state information.

Here, the base station device 3 and the terminal device 1 exchange (transmit/receive) signals with each other in higher layers. The base station device 3 and terminal device 1, for example, may transmit/receive Radio Resource Control (RRC) signaling in an RRC layer. Further, the base station device 3 and terminal device 1 may transmit/receive a Medium Access Control (MAC) CE in a MAC layer. Here, the RRC signaling and/or the MAC CE is also referred to as higher layer signaling. The RRC signaling and/or the MAC CE are included in the transport block.

In the present embodiment, the "RRC signaling", "RRC layer information", an "RRC layer signal", an "RRC layer parameter", an "RRC message", and an "RRC information element" denote the same constituent element.

The PUSCH is used for transmissions of the RRC signaling and the MAC CE. Here, the RRC signaling transmitted from the base station device 3 may be signaling that is common to multiple terminal devices 1 on a cell. Further, the RRC signaling transmitted from the base station device 3 may be signaling (also referred to as dedicated signaling) that is dedicated to a certain terminal device 1. In other words, user-equipment-specific (unique-to-user-equipment) information is transmitted through the signaling dedicated to the certain terminal device 1.

The PRACH is used for random access preamble transmissions. The PRACH is used for requests for an initial connection establishment procedure, a handover procedure, a connection re-establishment procedure, uplink transmission synchronization (timing adjustment), and a PUSCH (UL-SCH) resource.

The following uplink physical signal is used in the uplink radio communication. The uplink physical signal is not used for transmissions of information output from the higher layer, but is used by a physical layer.

Uplink Reference Signal (UL RS)

The following downlink physical channels are used for the downlink radio communication from the base station device 3 to the terminal device 1. The downlink physical channels are used for transmissions of information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcast of the Master Information Block (MIB), or the Broadcast Channel (BCH), which is shared by terminal devices 1.

The PCFICH is used for transmissions of information indicating regions (OFDM symbols) to be used for transmissions of the PDCCH.

The PHICH is used for transmissions of HARQ indicators (HARQ feedback or acknowledgement information) indicating acknowledgement (ACK) or negative acknowledgement (NACK) with respect to the uplink data (Uplink Shared Channel (UL-SCH)) received by the base station device 3.

The PDCCH and the EPDCCH are used for transmissions of downlink control information (DCI). For the sake of convenience, in the present embodiment, a "PDCCH" includes an "EPDCCH." The downlink control information is also referred to as a DCI format. The downlink control information transmitted on a single PDCCH includes a downlink grant and HARQ information, or an uplink grant and HARQ information. The downlink grant is also referred to as a downlink assignment or downlink allocation. The downlink assignment and the uplink grant are not transmitted simultaneously on a single PDCCH.

Figure 3:
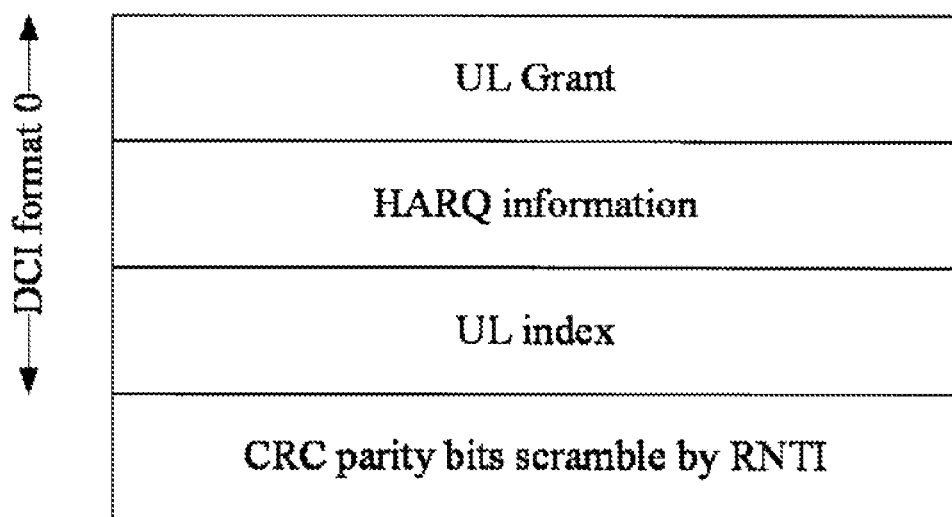
FIG. 3 is a diagram illustrating an example of a downlink control information (DCI) format 0 according to the present embodiment.

FIG. 3 is a diagram illustrating an example of a DCI format 0 according to the present embodiment. The DCI format 0 includes the uplink grant and the HARQ information. A DCI format 0 for the serving cell for which an uplink-downlink configuration (UL-DL configuration) 0 is configured may include a UL index field. The UL index indicates a subframe to which the PUSCH transmission scheduled by the DCI format 0 is adjusted. The UL index includes a first bit and a second bit. The terminal device 1 adjusts the PUSCH transmission to a first subframe when "1" is set to the first bit of the UL index. The terminal device 1 adjusts the PUSCH transmission to a second subframe when "1" is set to the second bit of the UL index. The terminal device 1 adjusts the PUSCH transmission to each of the first and second subframes when "1" is set to both the first and second bits of the UL index.

The downlink assignment is used for the scheduling of a single PDSCH in a single cell. The downlink assignment is used for the scheduling of a PDSCH in a subframe in which the downlink grant has been transmitted.

The uplink grant is used for the scheduling of a single PUSCH in a single cell. The uplink grant is used for the scheduling of a single PUSCH in the subframe after the subframe in which the uplink grant has been transmitted.

The HARQ information includes a New Data Indicator (NDI) and information indicating a transport block size. The HARQ information transmitted on the PDCCH together with the downlink assignment also includes information indicating a HARQ process number in the downlink (downlink HARQ process Identifier/Identity, downlink HARQ process number). The HARQ information transmitted on the PDCCH together with the uplink grant related to asynchronous HARQ may also include information indicating a HARQ process number in the uplink (uplink HARQ process Identifier/Identity, uplink HARQ process number). The HARQ information transmitted on the PDCCH with the uplink grant related to synchronous HARQ need not include information indicating a HARQ process number in the uplink (uplink HARQ process Identifier/Identity, uplink HARQ process number).

The NDI indicates initial transmission or retransmission. The HARQ entity instructs a certain HARQ process to trigger the initial transmission in a case that the NDI provided to the certain HARQ process by the HARQ information is toggled in comparison with the NDI value for the previous transmission of the certain HARQ process. The HARQ entity instructs a certain HARQ process to trigger retransmission a case that the NDI provided to the certain HARQ process by the HARQ information is not toggled in comparison with the NDI value for the previous transmission of the certain HARQ process. The HARQ process may determine whether or not the NDI is toggled.

The HARQ entity identifies a HARQ process related to the uplink grant and the HARQ information, and delivers the uplink grant and the HARQ information to the identified HARQ process. The HARQ process stores the uplink grant and the HARQ information delivered from the HARQ entity.

A cyclic redundancy check (CRC) parity bit added to the downlink control information transmitted on one PDCCH is scrambled with a Cell-Radio Network Temporary Identifier (C-RNTI), a Semi Persistent Scheduling (SPS) C-RNTI, or a Temporary C-RNTI. The C-RNTI and SPS C-RNTI are identifiers for identifying a terminal device in a cell. The temporary C-RNTI is an identifier for identifying the terminal device 1 that has transmitted a random access preamble during the contention based random access procedure.

The C-RNTI and temporary C-RNTI are used for control of the PDSCH transmission or the PUSCH transmission in a single subframe. The SPS C-RNTI is used for periodical allocation of a resource for the PDSCH or the PUSCH.

The PDSCH is used for transmissions of downlink data (downlink shared channel (DL-SCH)).

The PMCH is used for transmissions of multicast data (Multicast Channel: MCH).

The following downlink physical signals are used in the downlink radio communication. The downlink physical signals are not used for transmissions of the information output from the higher layer, but are used by the physical layer.

Synchronization signal (SS)

Downlink Reference Signal (DL RS)

The Synchronization signal is used for the terminal device 1 to be synchronized in terms of frequency and time domains in the downlink. In the TDD scheme, the Synchronization signal is mapped to subframes 0, 1, 5, and 6 within a radio frame. In the FDD scheme, the Synchronization signal is mapped to subframes 0 and 5 within a radio frame.

The Downlink Reference Signal is used for the terminal device 1 to perform channel compensation on the downlink physical channel. The Downlink Reference Signal is used for the terminal device 1 to calculate the downlink channel state information.

According to the present embodiment, the following five types of Downlink Reference Signals are used.

Cell-specific Reference Signal (CRS)

UE-specific Reference Signal (URS) associated with the PDSCH

Demodulation Reference Signal (DMRS) associated with the EPDCCH

Non-Zero Power Chanel State Information-Reference Signal (NZP CSI-RS)

Zero Power Chanel State Information-Reference Signal (ZP CSI-RS)

Multimedia Broadcast and Multicast Service over Single Frequency Network Reference signal (MBSFN RS)

Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. Channels used in the Medium Access Control (MAC) layer are referred to as transport channels. A unit of the transport channel used in the MAC layer is referred to as a transport block (TB) or a MAC Protocol Data Unit (PDU). Control of a Hybrid Automatic Repeat reQuest (HARD) is performed on each transport block in the MAC layer. The transport block is a unit of data that the MAC layer delivers to the physical layer. In the physical layer, the transport block is mapped to a codeword and subject to coding processing on a codeword-by-codeword basis.

The structure of the radio frame in the present embodiment will be described below.

LTE supports two types of radio frame structures. The two types of radio frame structures include a frame structure type 1 and a frame structure type 2. The frame structure type 1 can be applied to the FDD. The frame structure type 2 can be applied to the TDD.

Figure 4:
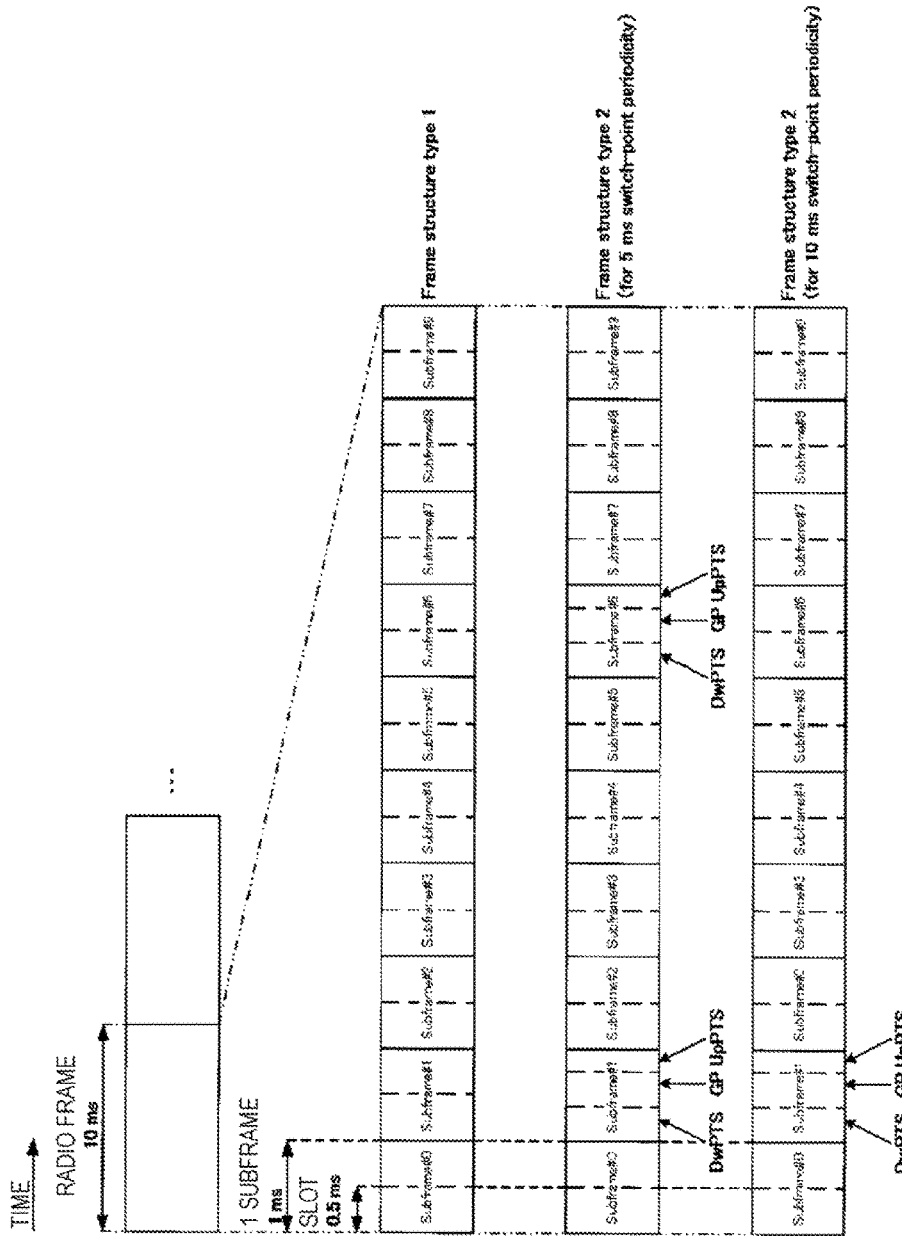
FIG. 4 is a diagram illustrating a schematic constitution of a radio frame according to the present embodiment.

FIG. 4 is a diagram illustrating a schematic constitution of the radio frame according to the present embodiment. In FIG. 4, the horizontal axis is a time axis. Each of the type 1 and type 2 radio frames is 10 ms in length and is defined by 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot.

The following three types of subframes are defined in the frame structure type 2.

Downlink subframe

Uplink subframe

Special subframe

The downlink subframe is a subframe reserved for downlink transmission. The uplink subframe is a subframe reserved for uplink transmission. The special subframe is constituted of three fields. The three fields include a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted only of the DwPTS and the GP, or may be constituted only of the GP and the UpPTS.

A radio frame of the frame structure type 2 is constituted of at least the downlink subframe, the uplink subframe, and the special subframe. The constitution of the radio frame of the frame structure type 2 is indicated by the uplink-downlink configuration (UL-DL configuration). The terminal device 1 receives information indicating the UL-DL configuration from the base station device 3. FIG. 5 is a table showing an example of the UL-DL configuration according to the present embodiment. In FIG. 5, D denotes a downlink subframe, U denotes an uplink subframe, and S denotes a special subframe.

A synchronous HARQ in the uplink will be described below.

In the synchronous HARQ, the HARQ process to which the uplink grant corresponds is associated with the subframe in which the uplink grant has been received and/or the subframe in which the PUSCH (UL-SCH) corresponding to the uplink grant is transmitted. The terminal device 1, in the synchronous HARQ, determines the HARQ process for the uplink grant on the basis of the subframe in which the uplink grant has been received and/or the subframe in which the PUSCH (UL-SCH) corresponding to the uplink grant is transmitted.

Figure 6:
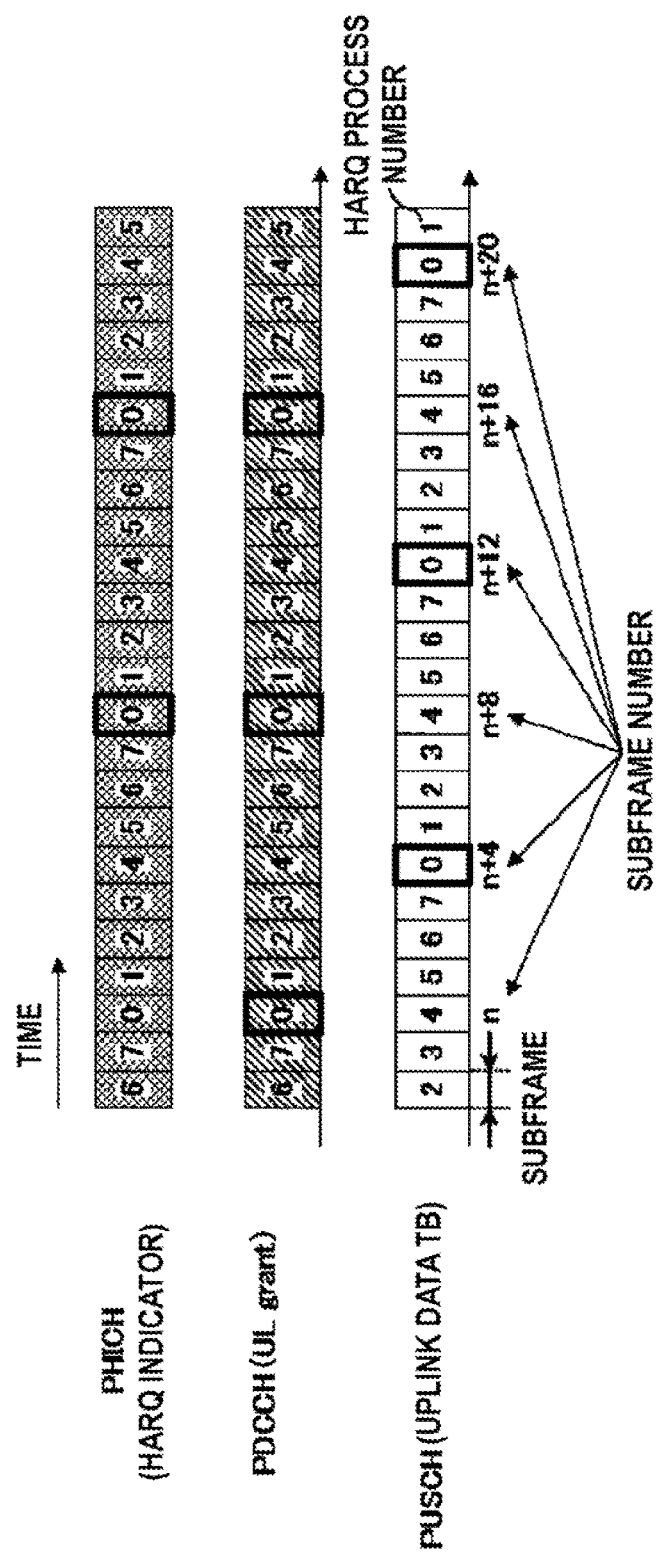
FIG. 6 is a diagram illustrating an example of a synchronous HARQ according to the present embodiment.

FIG. 6 is a diagram illustrating an example of a synchronous HARQ according to the present embodiment. In FIG. 6, one subframe corresponds to one HARQ process. In FIG. 6, the numerals in boxes indicates respective HARQ process numbers. In the synchronous HARQ, the HARQ entity determines the HARQ process on the basis of the subframe in which the MAC layer data is transmitted or the subframe in which the DCI format 0 corresponding to the MAC layer data is detected.

In FIG. 6, a subframe in which the MAC layer data corresponding to the uplink grant is transmitted is determined on the basis of the subframe in which the uplink grant has been received. For example, the MAC layer data corresponding to the uplink grant is transmitted on the PUSCH in the subframe located four subframes behind the subframe in which the stated uplink grant has been received.

In the synchronous HARQ, a HARQ indicator is transmitted on the PHICH in response to the uplink transmission. The relation between the subframe in which the uplink transmission has been performed and the subframe in which the corresponding PHICH is transmitted is predetermined. For example, a HARQ indicator corresponding to the MAC layer data is transmitted on the PHICH in the subframe located four subframes behind the subframe in which the stated MAC layer data has been transmitted on the PUSCH. Further, for example, the MAC layer data is retransmitted on the PUSCH in the subframe located four subframes behind the subframe in which NACK has been received on the PHICH.

An asynchronous HARQ in the uplink will be described below.

Figure 7:
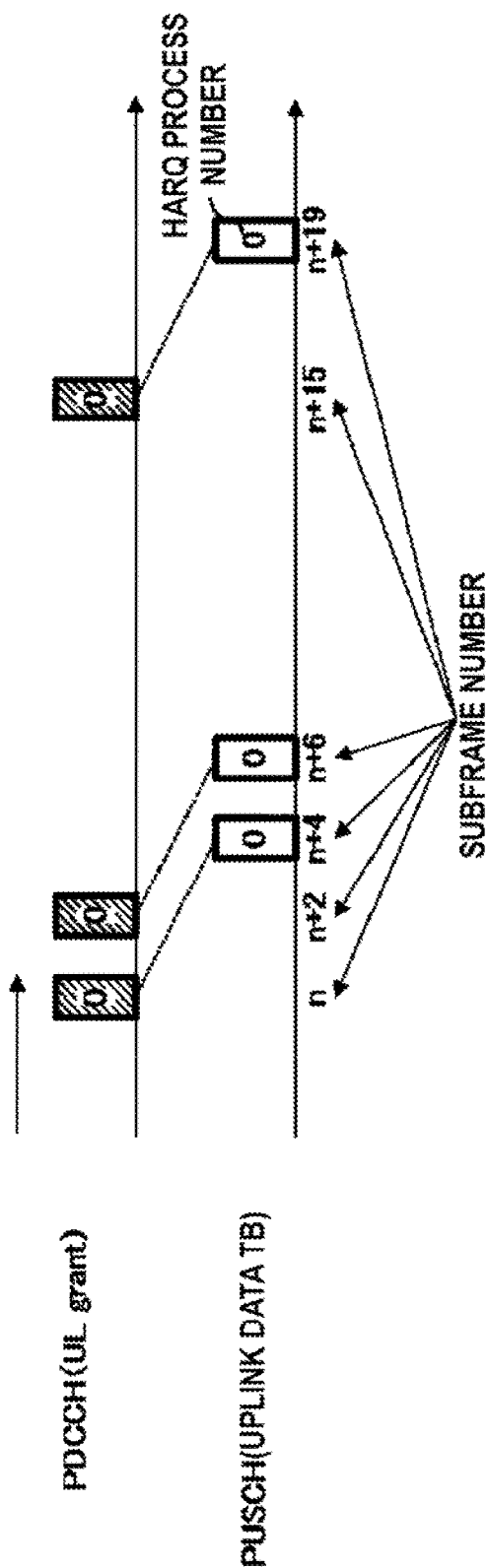
FIG. 7 is a diagram illustrating an example of an asynchronous HARQ according to the present embodiment.

FIG. 7 is a diagram illustrating an example of the asynchronous HARQ according to the present embodiment. In FIG. 7, one subframe corresponds to one HARQ process. In FIG. 7, the numeral in boxes indicates the corresponding HARQ process number. In the asynchronous HARQ, a HARQ entity determines the HARQ process on the basis of the HARQ information (information indicating a HARQ process number) included in the DCI format 0. In the asynchronous HARQ, a HARQ indicator is not transmitted on the PHICH in response to the uplink transmission. Thus, in the asynchronous HARQ, retransmission of the MAC layer data is always scheduled via the PDCCH.

In FIG. 7, the subframe in which the MAC layer data corresponding to the uplink grant is transmitted is determined on the basis of the subframe in which the uplink grant has been received. For example, the MAC layer data corresponding to the uplink grant is transmitted on the PUSCH in the subframe located four subframes behind the subframe in which the stated uplink grant has been received.

In a case that the DCI format 0 includes the UL index, the DCI format may include two pieces of information indicating a HARQ process. In a case that the DCI format 0 includes the UL index, and both the first bit and the second bit in the UL index are set to "1", one of the two HARQ processes indicated by the two pieces of information which indicate the HARQ process numbers may correspond to the first subframe for which the PUSCH transmission is adjusted, and the other of the two HARQ processes indicated by the two pieces of information which indicate the HARQ process numbers may correspond to a second subframe.

In a case that the DCI format 0 includes the UL index, the DCI format may include one piece of information indicating a HARQ process. In a case that the DCI format 0 includes the UL index, and both the first bit and the second bit in the UL index are set to "1", one HARQ process indicated by one piece of information which indicates the HARQ process number may correspond to both the first subframe and the second subframe for which the PUSCH transmission is adjusted.

In a case that the DCI format 0 includes the UL index in which the first bit is set to "1" and the second bit is set to "0", one HARQ process X indicated by the HARQ information (information indicating the HARQ process number) may correspond to the PUSCH transmission adjusted for the first subframe. In a case that the DCI format 0 includes the UL index in which the first bit is set to "0" and the second bit is set to "1", one HARQ process X indicated by the HARQ information (information indicating the HARQ process number) may correspond to the PUSCH transmission adjusted for the second subframe. In a case that the DCI format 0 includes the UL index in which both the first bit and the second bit are set to "1", one HARQ process X indicated by the HARQ information (information indicating a HARQ process number) may correspond to the PUSCH transmission (PUSCH transmission corresponding to the first bit) adjusted for the first subframe, and a HARQ process Y determined by the HARQ process X may correspond to the PUSCH transmission (PUSCH transmission corresponding to the second bit) adjusted for the second subframe. Here, X and Y may have a relation of $Y=(X+1) \mod Z$. Here, Z denotes the maximum number of the HARQ processes which are simultaneously managed by the HARQ entity. In other words, the HARQ process number for the PUSCH corresponding to the second bit in the UL index is determined at least on the basis of whether or not both the first bit and the second bit in the UL index are set to "1," and the information indicating the HARQ process number.

The maximum number Z of the HARQ processes which are simultaneously managed by one HARQ process will be described below.

One HARQ entity corresponding to an FDD serving cell simultaneously manages eight HARQ processes. The information indicating a HARQ process number included in the DCI format 0 corresponding to an FDD serving cell to which an asynchronous HARQ is applied may be 3 bits.

FIG. 8 is a diagram illustrating an example of the maximum number of the HARQ processes which are simultaneously managed by a HARQ entity corresponding to a TDD serving cell according to the present embodiment. The maximum number of the HARQ processes which are managed by one HARQ entity corresponding to the TDD serving cell may be determined on the basis of a UL-DL configuration configured for the TDD serving cell. Information indicating the HARQ process number included in the DCI format 0 corresponding to the TDD serving cell to which the asynchronous HARQ is applied may be determined on the basis of the UL-DL configuration configured for the TDD serving cell. In FIG. 8, in a case that the UL-DL configuration 5 is configured for the TDD serving cell to which the asynchronous HARQ is applied, the information indicating the HARQ process number included in the DCI format 0 corresponding to the TDD serving cell is 0 bit.

FIG. 9 is a diagram illustrating another example of the maximum number of the HARQ processes which are simultaneously managed by the HARQ entity corresponding to the TDD serving cell according to the present embodiment. The maximum number of the HARQ processes which are managed by one HARQ entity corresponding to the TDD serving cell may be based on whether the synchronous HARQ or the asynchronous HARQ is applied to the TDD serving cell. In FIG. 9, in a case that the synchronous HARQ is applied to the TDD serving cell, the maximum number of the HARQ processes which are managed by one HARQ entity corresponding to the TDD serving cell is determined on the basis of the UL-DL configuration configured for the TDD serving cell. In FIG. 9, in a case that the asynchronous HARQ is applied to the TDD serving cell, the maximum number of the HARQ processes which are managed by one HARQ entity corresponding to the TDD serving cell is eight regardless of the UL-DL configuration.

The number of bits of the information indicating the HARQ process number included in the DCI format 0 corresponding to the TDD serving cell may be based on whether the synchronous HARQ or the asynchronous HARQ is applied to the TDD serving cell. In FIG. 9, in a case that the asynchronous HARQ is applied to the TDD serving cell, the number of bits of the information indicating the HARQ process number included in the DCI format 0 corresponding to the TDD serving cell is three regardless of the UL-DL configuration.

The configuration related to HARQ in the RRC layer will be described below with reference to FIG. 10 to FIG. 13.

The terminal device 1 may control whether the synchronous HARQ or asynchronous HARQ is applied to each serving cell having an uplink component carrier or to each HARQ entity. In other words, the synchronous HARQ-applied HARQ process and the asynchronous HARQ-applied HARQ process need not correspond to the same serving cell. Thus, the synchronous HARQ-applied HARQ process and the asynchronous HARQ-applied HARQ process need not correspond to the same HARQ entity.

The base station device 3 may transmit the RRC layer information indicating the asynchronous HARQ to the terminal device 1 with respect to a certain serving cell. The terminal device 1, in a case that the RRC layer information indicating the asynchronous HARQ has been configured in the RRC layer, may apply the asynchronous HARQ to the corresponding serving cell (transmission in the corresponding serving cell). The terminal device 1, in a case that the RRC layer information indicating the asynchronous HARQ has not been configured in the RRC layer, may apply the synchronous HARQ to the corresponding serving cell. The RRC layer information indicating the asynchronous HARQ may be the information indicating that the asynchronous HARQ is enabled.

The base station device 3 may transmit, to the terminal device 1, the RRC layer information indicating the synchronous HARQ or asynchronous HARQ with respect to a certain serving cell. The terminal device 1, in a case that the RRC layer information indicating the asynchronous HARQ has been configured in the RRC layer, may apply the asynchronous HARQ to the corresponding serving cell. The terminal device 1, in a case that the RRC layer information indicating the synchronous HARQ has not been configured in the RRC layer, may apply the synchronous HARQ to the corresponding serving cell.

Figure 10:
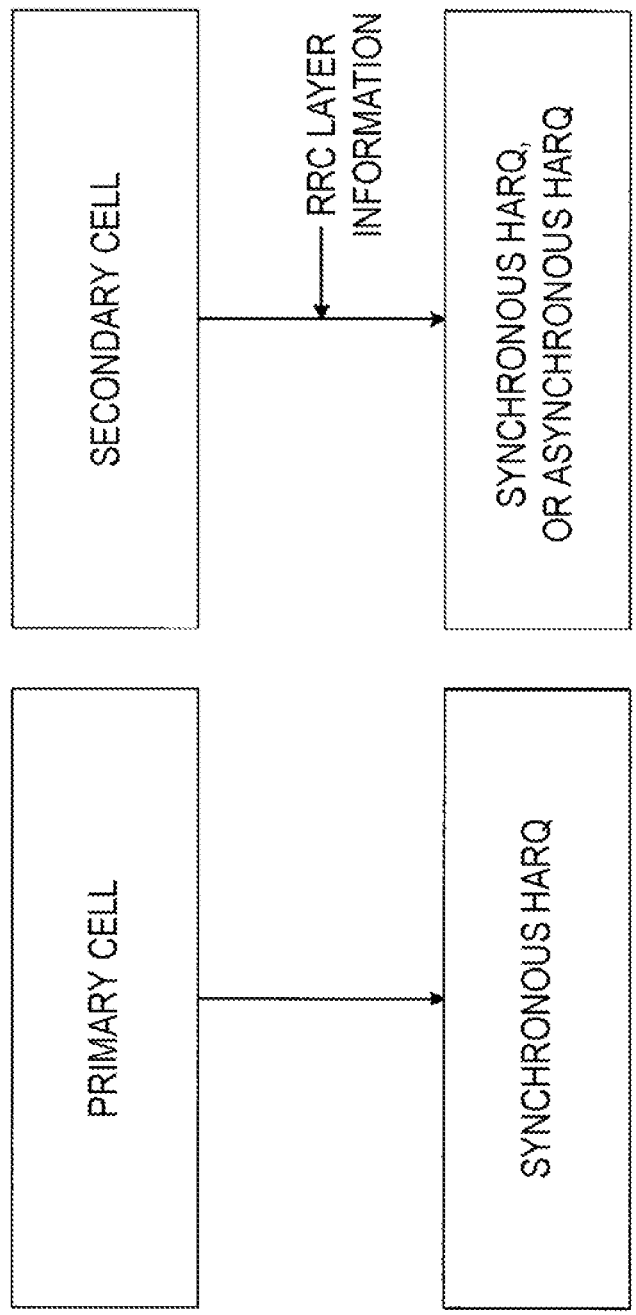
FIG. 10 is a diagram illustrating a first example of a measure for switching between the synchronous HARQ and the asynchronous HARQ according to the present embodiment.

FIG. 10 is a diagram illustrating a first example of a measure for switching between the synchronous HARQ and the asynchronous HARQ according to the present embodiment. In FIG. 10, whether the synchronous HARQ or the asynchronous HARQ is applied to the uplink on the serving cell is determined on the basis of the type of the serving cell (the primary cell or the secondary cell). In FIG. 10, regardless of the RRC layer information, the synchronous HARQ is always applied to the uplink on the primary cell (uplink transmission on the primary cell). In FIG. 10, the synchronous HARQ or the asynchronous HARQ is applied to the uplink on the secondary cell (uplink transmission on the secondary cell) on the basis of the RRC layer information corresponding to the secondary cell. With the above configuration, the synchronous HARQ is always applied to the uplink on the primary cell, which allows the RRC layer to control whether the synchronous HARQ or the asynchronous HARQ is applied to the secondary cell.

Figure 11:
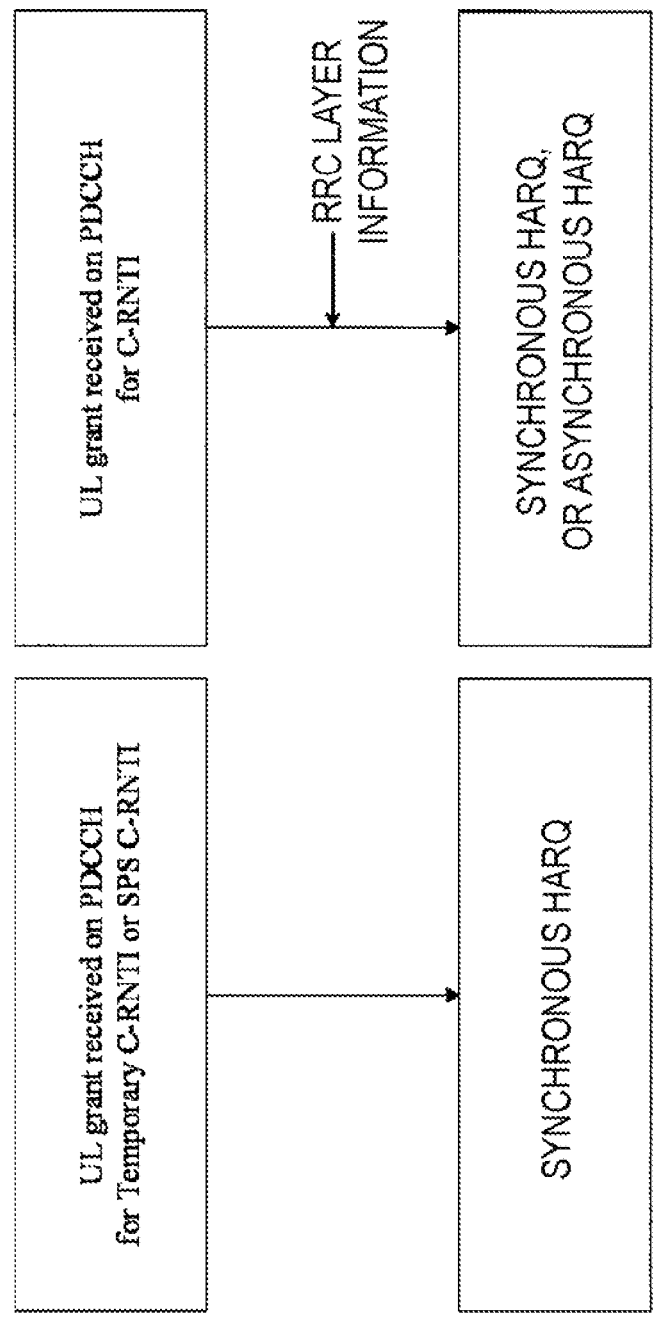
FIG. 11 is a diagram illustrating a second example of the measure for switching between the synchronous HARQ and the asynchronous HARQ according to the present embodiment.

FIG. 11 is a diagram illustrating a second example of a measure for switching between the synchronous HARQ and the asynchronous HARQ according to the present embodiment. In FIG. 11, whether the synchronous HARQ or the asynchronous HARQ is applied to the uplink is determined on the basis of a Radio Network Temporary Identifier (RNTI) to which the uplink grant corresponds. In FIG. 11, regardless of the RRC layer information, the synchronous HARQ is always applied to the MAC layer data (uplink data transmission) corresponding to the uplink grant received on the PDCCH including the CRC parity bits scrambled with the Temporary C-RNTI or the SPS C-RNTI. In FIG. 11, on the basis of the RRC layer information, the synchronous HARQ or the asynchronous HARQ is applied to the MAC layer data corresponding to the uplink grant received on the PDCCH including the CRC parity bits scrambled with the C-RNTI.

Figure 12:
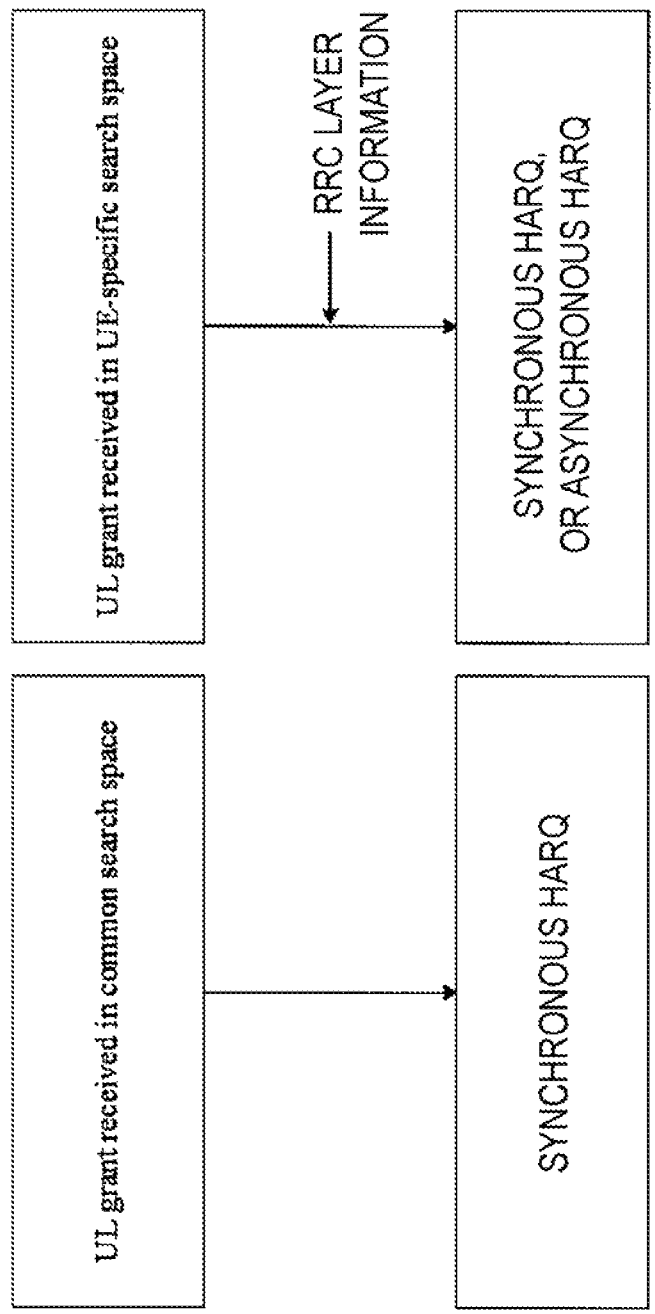
FIG. 12 is a diagram illustrating a third example of the measure for switching between the synchronous HARQ and the asynchronous HARQ according to the present embodiment.

FIG. 12 is a diagram illustrating a third example of a measure for switching between the synchronous HARQ and the asynchronous HARQ according to the present embodiment. In FIG. 12, in the uplink, whether the synchronous HARQ or the asynchronous HARQ is applied is determined on the basis of the type of a search space in which the uplink grant has been received. In FIG. 12, regardless of the RRC layer information, the synchronous HARQ is always applied to the MAC layer data corresponding to the uplink grant received through a Common Search Space. In FIG. 12, on the basis of the RRC layer information, the synchronous HARQ or the asynchronous HARQ is applied to the MAC layer data corresponding to the uplink grant received through a UE-specific Search Space.

The UE-specific Search Space is determined at least on the basis of the C-RNTI value set by the terminal device 1. That is, the UE-specific Search Spaces are individually determined for respective terminal devices 1. In other words, the Common Search Space is a search space common to multiple terminal devices 1. The terminal devices 1 not supporting the asynchronous HARQ and the terminal devices 1 supporting the asynchronous HARQ share the Common Search Space. In addition, the Common Search Space is used for broadcasting the common PDCCH to the terminal devices 1 supporting the asynchronous HARQ and the terminal devices 1 not supporting the asynchronous HARQ. Consequently, the DCI format 0 transmitted in the Common Search Space preferably has the same payload size as before. Thus, the DCI format 0 transmitted in the Common Search Space does not include information for indicating a HARQ process number. Only the DCI format 0 transmitted in the UE-specific Search Space includes the information for indicating a HARQ process number. The synchronous HARQ is always applied to the MAC layer data corresponding to the uplink grant received through the Common Search Space, whereby addition of the information for indicating a HARQ process number to the DCI format 0 transmitted in the Common Search Space becomes unnecessary, and the payload size of the DCI format 0 transmitted in the Common Search Space is the same as before.

Figure 13:
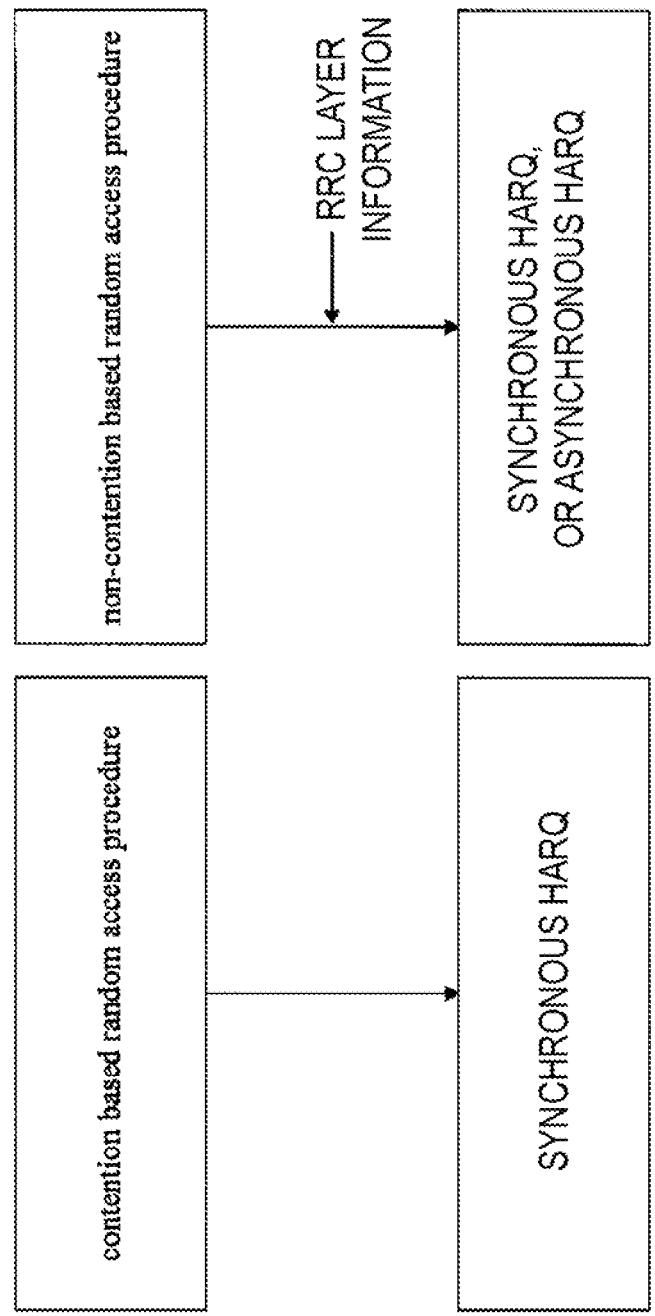
FIG. 13 is a diagram illustrating fourth example of the measure for switching between the synchronous HARQ and the asynchronous HARQ according to the present embodiment.

FIG. 13 is a diagram illustrating a fourth example of a measure for switching between the synchronous HARQ and the asynchronous HARQ according to the present embodiment. In FIG. 13, whether the synchronous HARQ or the asynchronous HARQ is applied to the uplink is determined on the basis of the type of random access procedure. In FIG. 13, regardless of the RRC layer information, the synchronous HARQ is always applied to the MAC layer data corresponding to the uplink grant included in a random access response associated with the contention based random access procedure. In FIG. 13, on the basis of the RRC layer information, the synchronous HARQ or the asynchronous HARQ is applied to the MAC layer data corresponding to the uplink grant included in the random access response associated with the non-contention based random access procedure.

In FIG. 11 to FIG. 13, the asynchronous HARQ may be applied to the primary cell. In the above case, the synchronous HARQ may be applied to transmission of a random access message 3 on the primary cell. Further, the synchronous HARQ may be applied to the MAC layer data corresponding to the uplink grant received through the Common Search Space on the primary cell.

Although the first to fourth examples of the measure for switching between the synchronous HARQ and the asynchronous HARQ have been described with reference to FIG. 10 to FIG. 13, the specific configuration is not limited to the first to fourth examples, and includes, for example, an amendment to a design that falls within the scope that does not depart from the gist of the present invention. Furthermore, embodiments obtained by suitably combining technical means disclosed according to the first to fourth examples of the present embodiment are also included in the technical scope of the present invention.

The random access procedure will be described below.

The random access procedure may be executed on the primary cell and secondary cell according to the present embodiment. However, only one random access procedure is executed in any point of the time domain. That is, multiple random access procedures are not executed simultaneously.

According to the present embodiment, both the contention based random access procedure and the non-contention based random access procedure may be executed on the primary cell. According to the present embodiment, the non-contention based random access procedure may be executed on the secondary cell. According to the present embodiment, the contention based random access procedure is not executed on the secondary cell.

The random access preamble may be transmitted on the PRACH on the primary cell. The terminal device 1 receives information (RRC message) related to the random access procedure on the primary cell from the base station device 3. The information related to the random access procedure on the primary cell includes information indicating a set of PRACH resources on the primary cell.

The random access preamble may be transmitted on the PRACH on the secondary cell. The terminal device 1 receives the information (RRC message) related to the random access procedure on the secondary cell from the base station device 3. The information related to the random access procedure on the secondary cell includes information indicating a set of PRACH resources on the secondary cell.

In the contention based random access procedure, the terminal device 1 itself selects a random access preamble index. In the non-contention based random access procedure, the random access preamble index is selected on the basis of the information that the terminal device 1 has received from the base station device 3. In a case that all the bit values in the information received from the base station device 3 are 0, the terminal device 1 executes the contention based random access procedure in which the terminal device 1 itself selects the random access preamble index.

The random access response to the primary cell or the secondary cell is transmitted on the PDSCH on the primary cell. The random access response includes an uplink grant field mapped to the uplink grant and a Temporary C-RNTI field mapped to the information for indicating the Temporary C-RNTI. The uplink grant included in the random access response is also referred to as a random access response grant.

In a case that the received random access response includes a random access preamble identifier corresponding to the transmitted random access preamble and the terminal device 1 selects a random access preamble on the basis of the information received from the base station device 3, the terminal device 1 considers that the non-contention based random access procedure has been successfully completed, and transmits the PUSCH on the basis of the uplink grant included in the random access response.

In a case that the received random access response includes a random access preamble identifier corresponding to the transmitted random access preamble and the terminal device 1 itself selects the random access preamble, the terminal device 1 sets the Temporary C-RNTI to the Temporary C-RNTI field value included in the received random access response, and transmits the random access message 3 on the PUSCH on the basis of the uplink grant included in the random access response.

The PUSCH corresponding to the uplink grant included in the random access response is transmitted on the serving cell on which the corresponding preamble has been transmitted on the PRACH.

In a case that the Temporary C-RNTI is not set, the PUSCH corresponding to the uplink grant included in the random access response and the PUSCH retransmission in the same transport block are scrambled on the basis of the C-RNTI.

In a case that the Temporary C-RNTI is set, the PUSCH corresponding to the uplink grant included in the random access response and the PUSCH retransmission in the same transport block are scrambled on the basis of the Temporary C-RNTI.

In a case that the Temporary C-RNTI is set, the PUSCH retransmission of the transport block transmitted on the PUSCH corresponding to the uplink grant included in the random access response is scheduled by the DCI format 0 to which the CRC parity bits scrambled with the Temporary C-RNTI have been added. The DCI format 0 is transmitted on the PDCCH in the Common Search Space.

Figure 14:
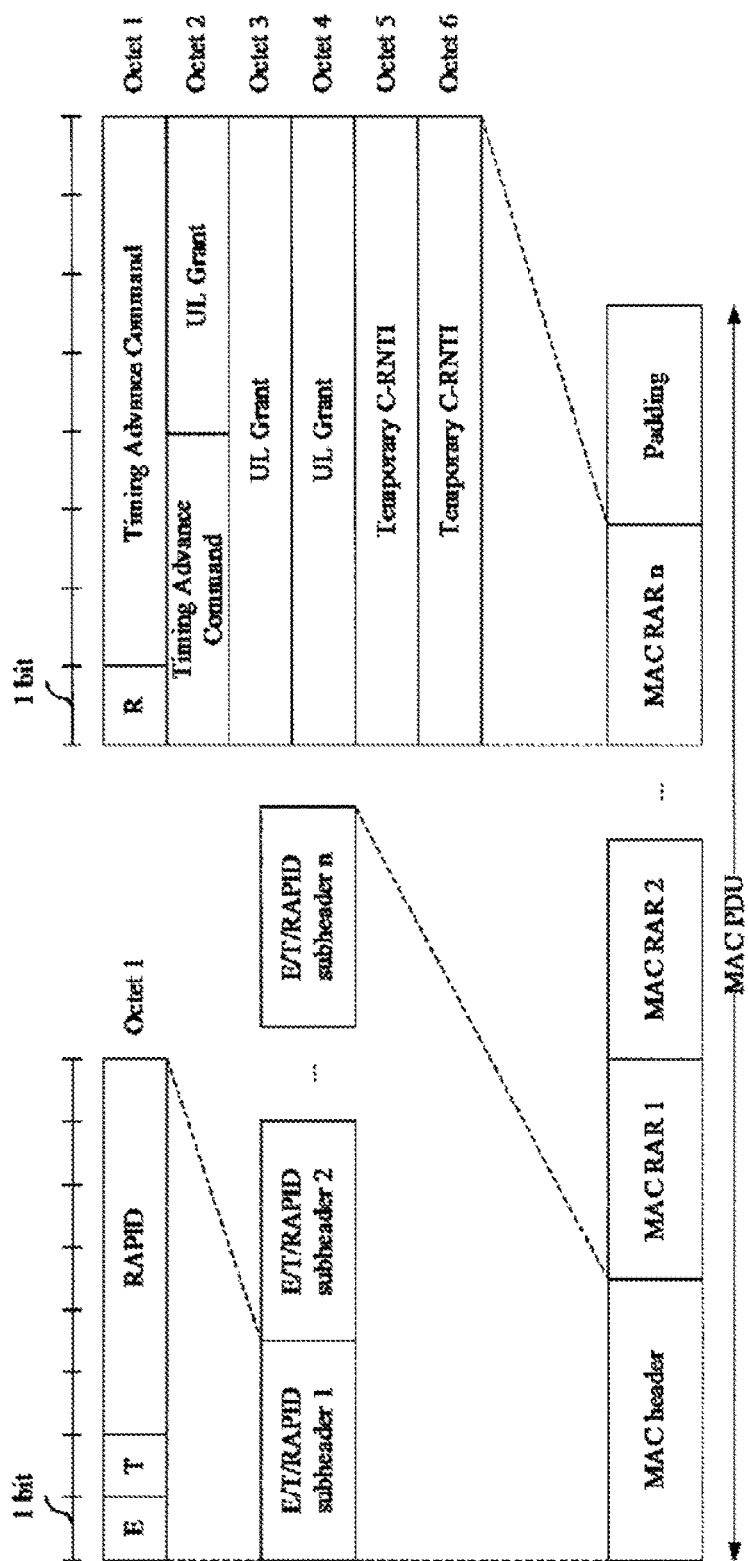
FIG. 14 is a diagram illustrating an example of a random access response according to the present embodiment.

FIG. 14 is a diagram illustrating an example of the random access response according to the present embodiment.

In the downlink, one MAC PDU can include multiple random access responses. In FIG. 14, the random access response (MAC RAR) indicates the random access response. The MAC PDU in FIG. 14 includes one MAC header, n random access responses, and padding. In FIG. 14, one MAC header includes n E/T/RAPID subheaders (E/T/RAPID fields).

The E/T/RAPID subheader includes an Extension field (E field), a Type field (T field), and a Random Access Preamble IDentifier field (RAPID field). The E field is a flag indicating whether or not more fields are present in the MAC header. The E field is set to "1" to indicate that at least another E/T/RAPID field follows. The E field is set to "0" to indicate that the MAC RAR or the padding starts from the next byte.

The T field is a flag to indicate that the MAC subheader includes any of RAPID fields and backoff indicator fields. The T field is set to "1" to indicate the presence of the RAPID field in the MAC subheader.

The RAPID field identifies the transmitted random access preamble. The terminal device 1, in a case that the random access preamble transmitted by the terminal device 1 corresponds to the RAPID field, considers that the random access response has been successfully received, and processes the corresponding MAC RAR.

The MAC RAR includes an R field, a timing advance command field, an uplink grant field, and a Temporary C-RNTI field. The R field is a reserved bit set to 0. The timing advance command field indicates an index value $T_A$ used to control the amount of timing adjustment for the PUSCH/SRS transmission.

The uplink grant field indicates a PUSCH resource used in the uplink. The uplink grant is mapped to the uplink grant field. The Temporary C-RNTI field indicates the Temporary C-RNTI used by the terminal device 1 during the contention based random access procedure.

The random access response (MAC RAR) does not include information indicating the HARQ process number, which results in a problem that the HARQ process number corresponding to the uplink grant included in the random access response associated with the non-contention based random access procedure cannot be identified.

Then, the information indicating the HARQ process number, to which the uplink grant included in the random access response corresponds, may be mapped to the temporary C-RNTI field included in the same random access response associated with the non-contention based random access procedure on the serving cell to which asynchronous HARQ is applied. In other words, the Temporary C-RNTI field, included in the random access response associated with the non-contention based random access procedure on the serving cell to which the asynchronous HARQ is applied, may be reused to identify the HARQ process number to which the uplink grant included in the same random access response corresponds.

The random access response associated with the non-contention based random access procedure on the serving cell to which the asynchronous HARQ is applied may include a HARQ information field instead of the Temporary C-RNTI field. Further, the MAC RAR may include an F field, which is a flag indicating which of the Temporary C-RNTI field and the HARQ information field is included. The MAC RAR including the F field is referred to as an extended MAC RAR according to the present embodiment.

The HARQ information field included in the MAC RAR is at least mapped to the information indicating the HARQ process number. In other words, the HARQ information field included in the MAC RAR is at least used to indicate the HARQ process number. Further, the HARQ information field included in the MAC RAR may be used to indicate a modulation scheme and a coding scheme. Further, the HARQ information field included in the MAC RAR may be used to indicate a redundancy version.

Figure 15:
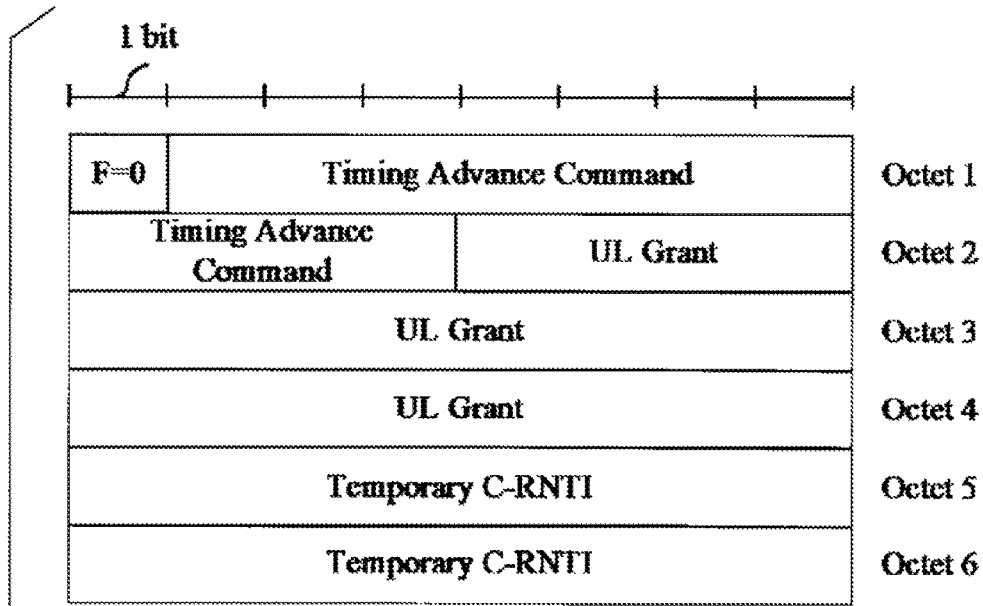
FIG. 15 is a diagram illustrating an example of an extended MAC RAR according to the present embodiment.
Figure 15:
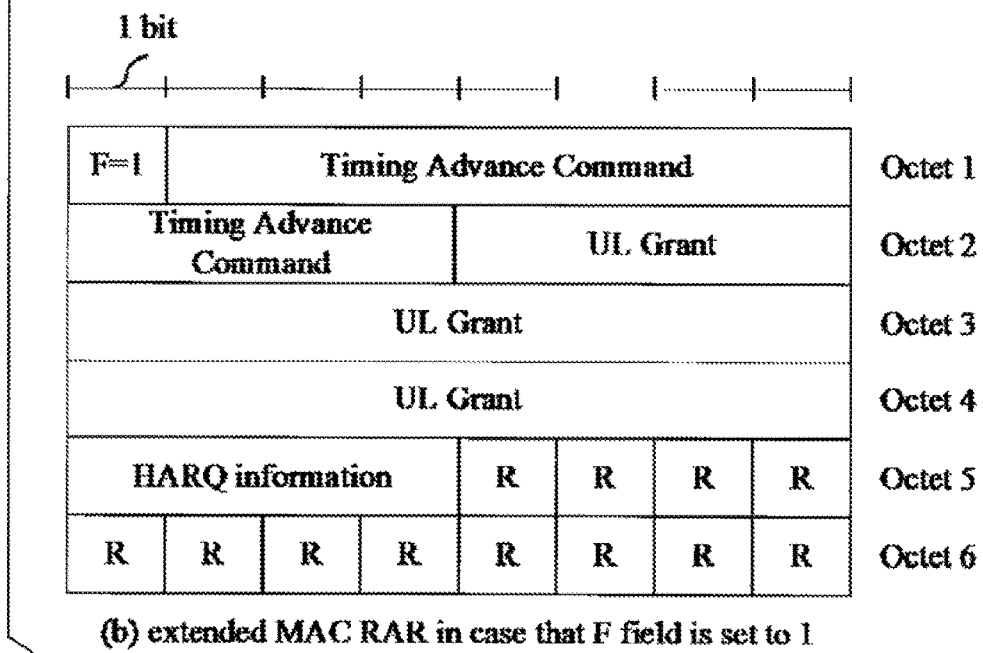

FIG. 15 is a diagram illustrating an example of the extended MAC RAR according to the present embodiment. (a) in FIG. 15 is a diagram illustrating an example of the extended MAC RAR when the F field is set to "0." In a case that the extended MAC RAR includes the Temporary C-RNTI field, the F field included in the extended MAC RAR is set to "0." (b) in FIG. 15 is a diagram illustrating an example of the extended MAC RAR when the F field is set to "1." In a case that the extended MAC RAR includes the HARQ information field, the F field included in the extended MAC RAR is set to "1."

This allows the terminal device 1 to identify the fields included in the extended MAC RAR. In a case that the F field is set to "0," this enables the terminal devices of the related art to recognize the extended MAC RAR as the known MAC RAR. Consequently, even in a case that the known MAC RAR and the extended MAC RAR are multiplexed in one MAC PDU, the terminal devices of the related art are not affected.

Further, the HARQ process number to which the uplink grant corresponds may be a specific value, the uplink grant being included in the random access response associated with the non-contention based random access procedure on the serving cell to which the asynchronous HARQ is applied. For example, the specific value may be indicated with the RRC layer information. For example, the specific value may be based on whether the serving cell supports FDD or TDD. For example, the specific value may be based on the UL-DL configuration. For example, the specific value may be predetermined in specifications or the like.

Further, the terminal device 1 may consider the uplink grant as invalid, the uplink grant being included in the random access response associated with the non-contention based random access procedure on the serving cell to which asynchronous HARQ is applied. In other words, the terminal device 1 may ignore/discard the uplink grant included in the random access response associated with the non-contention based random access procedure on the serving cell to which the asynchronous HARQ is applied.

The reconfiguration/modification of the HARQ functionality will be described below.

As described above, whether the synchronous HARQ or asynchronous HARQ is applied to the secondary cell is controlled by the RRC layer. The terminal device 1 can perform reconfiguration/modification on the HARQ functionality on a certain secondary cell. For example, the terminal device 1, after configuring the asynchronous HARQ to a certain secondary cell on the basis of the RRC layer information, can reconfigure the synchronous HARQ to the certain secondary cell on the basis of another RRC layer information. For example, the terminal device 1, after configuring the synchronous HARQ to a certain secondary cell on the basis of the RRC layer information, can reconfigure the asynchronous HARQ to the certain secondary cell on the basis of another RRC layer information. For example, the terminal device 1, after configuring the asynchronous HARQ to a certain secondary cell on the basis of the RRC layer information indicating that the asynchronous HARQ is enabled, can release the RRC layer information and reconfigure the synchronous HARQ to the certain secondary cell. This configuration allows the HARQ functionality to be flexibly controlled. Here, the RRC layer information indicates the synchronous HARQ or the asynchronous HARQ. Further, the RRC layer information may be information indicating that the asynchronous HARQ is enabled.

The terminal device 1 transmits an RRC complete message to the base station device 3 after reconfiguring/modifying the HARQ functionality. The base station device 3 can recognize whether the synchronous HARQ or the asynchronous HARQ is configured as the HARQ functionality in the terminal device 1 on the basis of the reception of the RRC complete message.

However, the maximum number of the HARQ processes simultaneously managed by the HARQ entity corresponding to the secondary cell may differ depending on whether the synchronous HARQ or the asynchronous HARQ is applied to the secondary cell. This configuration, in a case that the RRC layer information related to the HARQ functionality for a certain secondary cell has been modified (reconfigured or released), may prevent the base station device 3 from recognizing the ongoing HARQ process performed by the terminal device 1.

Therefore, the terminal device 1, in a case that the RRC layer information for a certain serving cell is modified (reconfigured or released), may flush multiple HARQ buffers for the serving cell, of the multiple HARQ buffers which the terminal device 1 includes, except for the buffer related to the random access message 3. Further, the terminal device 1, in a case that the RRC layer information for a certain serving cell is modified (reconfigured or released), may set the value of the NDI with respect to the HARQ process for the serving cell to 0, except for the NDI related to the random access message 3. Further, the terminal device 1 and the base station device 3, in a case that the RRC layer information for a certain serving cell is modified (reconfigured or released), may consider the next transmission related to the HARQ process for the serving cell as the initial transmission, except for the transmission related to the random access message 3. Moreover, the terminal device 1 and the base station device 3, in a case that the RRC layer information for a certain serving cell is modified (reconfigured or released), may initialize the HARQ entity for the serving cell.

Then, the terminal device 1, in a case that the RRC layer information for a certain secondary cell is modified (reconfigured or released), may flush multiple HARQ buffers for the secondary cell, of the multiple HARQ buffers which the terminal device 1 includes. Further, the terminal device 1, in a case that the RRC layer information for a certain secondary cell is modified (reconfigured or released), may set the value of the NDI with respect to the HARQ process for the secondary cell to 0. Further, the terminal device 1 and the base station device 3, in a case that the RRC layer information for a certain secondary cell is modified (reconfigured or released), may consider the next transmission related to the HARQ process for the secondary cell as the initial transmission. Moreover, the terminal device 1 and the base station device 3, in a case that the RRC layer information for a secondary serving cell is modified (reconfigured or released), may initialize the HARQ entity for the secondary cell.

This configuration, in a case that the base station device 3 transmits the RRC layer information which indicates reconfiguration/modification of the HARQ functionality to the terminal device 1, allows the base station device 3 to properly control the HARQ process after reconfiguring/modifying the HARQ functionality.

The constitutions of devices according to the present embodiment will be described below.

Figure 16:
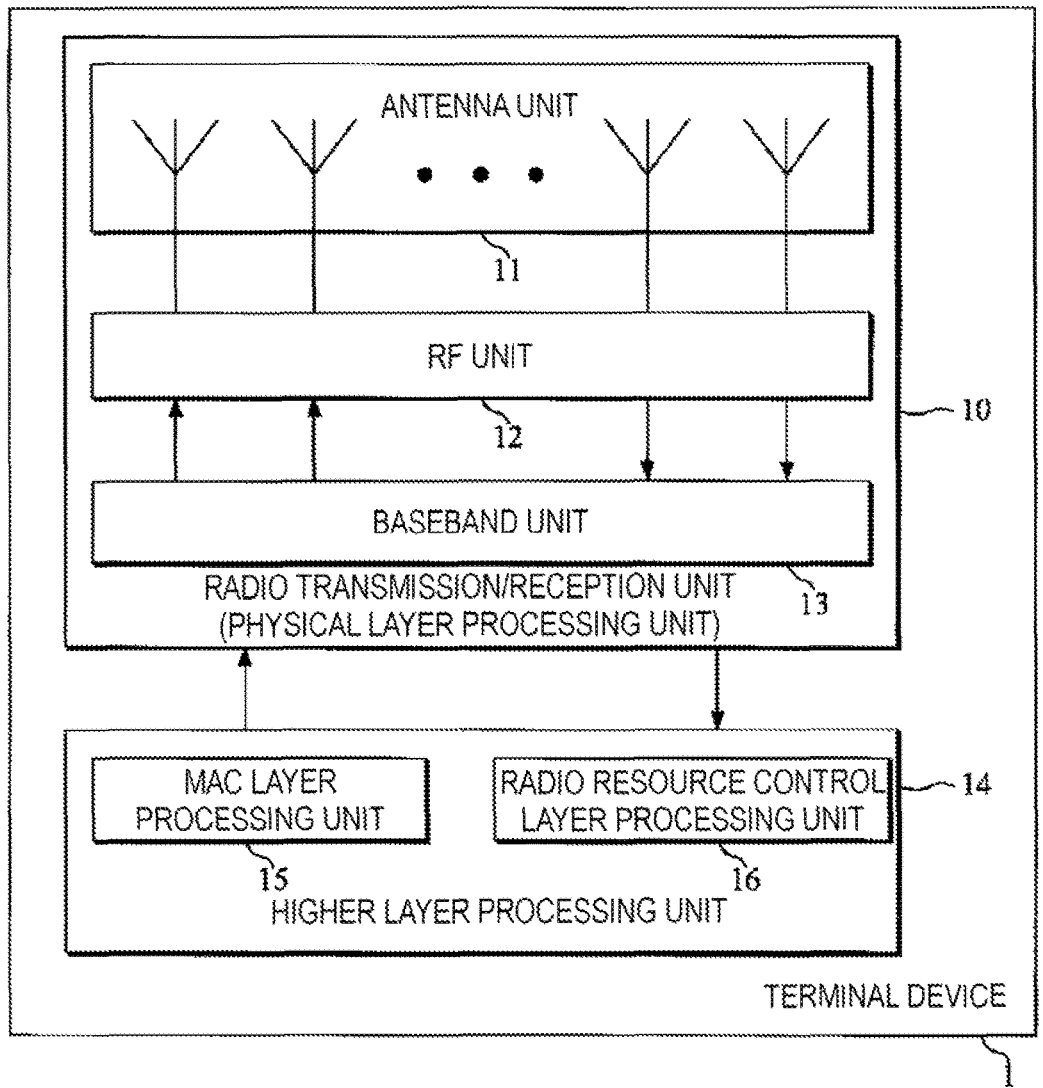
FIG. 16 is a schematic block diagram illustrating a constitution of a terminal device 1 according to the present embodiment.

FIG. 16 is a schematic block diagram illustrating the constitution of the terminal device 1 according to the present embodiment. As illustrated, the terminal device 1 includes a radio transmission/reception unit 10 and a higher layer processing unit 14. The radio transmission/reception unit 10 includes an antenna unit 11, a Radio Frequency (RF) unit 12, and a baseband unit 13. The higher layer processing unit 14 includes a MAC layer processing unit 15 and a Radio Resource Control layer processing unit 16. The radio transmission/reception unit 10 is also referred to as a transmission unit, a reception unit, or a physical layer processing unit.

The higher layer processing unit 14 outputs uplink data (transport block) created by a user operation or the like, to the radio transmission/reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The MAC layer processing unit 15 in the higher layer processing unit 14 performs the processes of the MAC layer. The MAC layer processing unit 15 controls a HARQ on the basis of on various configuration information/parameters managed by the Radio Resource Control layer processing unit 16. The MAC layer processing unit 15 manages multiple HARQ entities, multiple HARQ processes, and multiple HARQ buffers.

The Radio Resource Control layer processing unit 16 in the higher layer processing unit 14 performs the processes of the Radio Resource Control layer. The Radio Resource Control layer processing unit 16 manages its own various configuration information/parameters. The Radio Resource Control layer processing unit 16 sets the various configuration information/parameters on the basis of the RRC layer signal received from the base station device 3. In other words, the Radio Resource Control layer processing unit 16 sets the various configuration information/parameters on the basis of the information indicating the various configuration information/parameters received from the base station device 3.

The radio transmission/reception unit 10 performs the processes of the physical layer, such as modulation, demodulation, coding, and decoding. The radio transmission/reception unit 10 demultiplexes, demodulates, and decodes a signal received from the base station device 3, and outputs the information resulting from the decoding to the higher layer processing unit 14. The radio transmission/reception unit 10 modulates and codes data to create a transmit signal, and transmits the transmit signal to the base station device 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a cyclic prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data to create an SC-FDMA symbol, attaches a CP to the created SC-FDMA symbol, creates a digital signal in a baseband, and converts the digital signal in the baseband into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. The RF unit 12 amplifies the power. Further, the RF unit 12 may include functionality for controlling the transmit power. The RF unit 12 is also referred to as a transmit power control unit.

Figure 17:
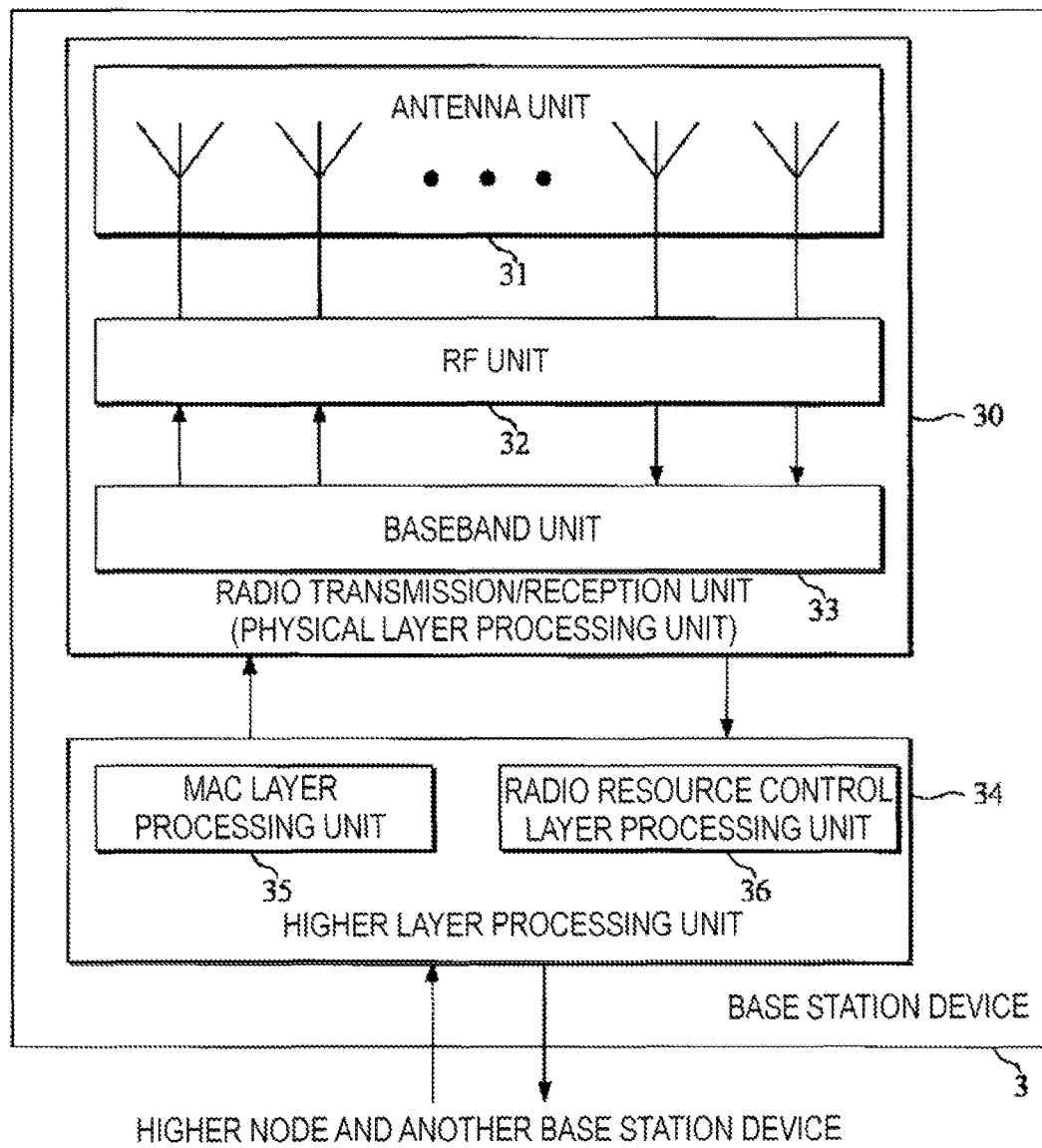
FIG. 17 is a schematic block diagram illustrating a constitution of a base station device 3 according to the present embodiment.

FIG. 17 is a schematic block diagram illustrating the constitution of the base station device 3 according to the present embodiment. As illustrated, the base station device 3 includes a radio transmission/reception unit 30 and a higher layer processing unit 34. The radio transmission/reception unit 30 includes an antenna unit 31, an RF unit 32, and a baseband unit 33. The higher layer processing unit 34 includes a MAC layer processing unit 35 and a Radio Resource Control layer processing unit 36. The radio transmission/reception unit 30 is also referred to as a transmission unit, a reception unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The MAC layer processing unit 35 in the higher layer processing unit 34 performs the processes of the MAC layer. The MAC layer processing unit 15 controls a HARQ on the basis of on various configuration information/parameters managed by the Radio Resource Control layer processing unit 16. The MAC layer processing unit 15 creates ACK/NACK and HARQ information for the uplink data (UL-SCH). The ACK/NACK and HARQ information for the uplink data (UL-SCH) are transmitted on the PHICH or PDCCH to the terminal device 1.

The Radio Resource Control layer processing unit 36 in the higher layer processing unit 34 performs the processes of the Radio Resource Control layer. The Radio Resource Control layer processing unit 36 creates or acquires, from a higher node, downlink data (transport block) arranged on a physical downlink shared channel, system information, an RRC message, a MAC control element (CE) or the like, and outputs the created or acquired data to the radio transmission/reception unit 30. Furthermore, the Radio Resource Control layer processing unit 36 manages various configuration information/parameters for each of the terminal devices 1. The Radio Resource Control layer processing unit 36 may set the various configuration information/parameters for each of the terminal devices 1 via a higher layer signal. In other words, the Radio Resource Control layer processing unit 36 transmits/broadcasts information indicating the various configuration information/parameters.

The capability of the radio transmission/reception unit 30 is similar to that of the radio transmission/reception unit 10, and hence description thereof is omitted.

Hereinafter, various aspects of the terminal device and the base station device will be described according to the present embodiment.

(1) The terminal device according to the present embodiment is a terminal device configured to communicate, on multiple serving cells including one primary cell and one secondary cell, with the base station device. The terminal device includes: a reception unit configured to receive RRC layer information indicating an asynchronous HARQ; a MAC layer processing unit configured to manage a first HARQ process for the primary cell and a second HARQ process for the secondary cell; and a transmission unit configured to transmit MAC layer data in accordance with the indication from the first HARQ process and the second HARQ process. The MAC layer processing unit, regardless of whether or not the RRC layer information indicating the asynchronous HARQ is configured, instructs the first uplink HARQ process to always execute a synchronous HARQ; and, on the basis of whether or not the RRC layer information indicating the asynchronous HARQ is configured, instructs the second uplink HARQ process to execute the synchronous HARQ or the asynchronous HARQ.

(2) The base station device according to the present embodiment is a base station device configured to communicate, on multiple serving cells including one primary cell and one secondary cell, with the terminal device. The base station device includes a transmission unit configured to transmit the RRC layer information indicating asynchronous HARQ, a MAC layer processing unit to manage a first HARQ process for the primary cell and a second HARQ process for the secondary cell, and a reception unit configured to receive the MAC layer data in accordance with the indication from the first HARQ process and the second HARQ process. The MAC layer processing unit, regardless of whether or not the RRC layer information indicating the asynchronous HARQ is configured in the terminal device, instructs the first uplink HARQ process to always execute the synchronous HARQ; and, on the basis of whether or not the RRC layer information indicating the asynchronous HARQ is configured in the terminal device, instructs the second uplink HARQ process to execute the synchronous HARQ or the asynchronous HARQ.

(3) In the present embodiment, the primary cell is the cell in which the terminal device executes the initial connection establishment procedure, the cell in which the terminal device initiates the connection re-establishment procedure, or the cell which is indicated as the primary cell in the handover procedure.

(4) The terminal device according to the present embodiment includes a reception unit configured to receive the RRC layer information indicating the asynchronous HARQ and the uplink grant, and a transmission unit configured to transmit the MAC layer data in accordance with the uplink grant on the secondary cell. Regardless of whether or not the RRC layer information indicating the asynchronous HARQ is configured, the synchronous HARQ is always applied to the MAC layer data corresponding to the uplink grant received on the physical downlink control channel including CRC parity bits scrambled with the Temporary C-RNTI. Whether the synchronous HARQ or the asynchronous HARQ is applied to the MAC layer data corresponding to the uplink grant received on the physical downlink control channel including CRC parity bits scrambled with the C-RNTI is determined on the basis of whether or not the RRC layer information indicating the asynchronous HARQ is configured.

(5) The base station device according to the present embodiment includes a transmission unit configured to transmit the RRC layer information indicating asynchronous HARQ and the uplink grant, and a reception unit configured to receive the MAC layer data in accordance with the uplink grant on the secondary cell. Regardless of whether or not the RRC layer information indicating the asynchronous HARQ is configured in the terminal device, the synchronous HARQ is always applied to the MAC layer data corresponding to the uplink grant transmitted on the physical downlink control channel including CRC parity bits scrambled with the Temporary C-RNTI. Whether the synchronous HARQ or the asynchronous HARQ is applied to the MAC layer data corresponding to the uplink grant transmitted on the physical downlink control channel including CRC parity bits scrambled with the C-RNTI in the terminal device is determined on the basis of whether or not the RRC layer information indicating the asynchronous HARQ is configured in the terminal device.

(6) In the terminal device according to the present embodiment, regardless of whether or not the RRC layer information indicating the asynchronous HARQ is configured, the synchronous HARQ is always applied to the MAC layer data corresponding to the uplink grant included in the random access response related to the contention based random access procedure.

(7) In the present embodiment, whether the synchronous HARQ or the asynchronous HARQ is applied to the MAC layer data corresponding to the uplink grant included in the random access response related to the non-contention based random access procedure is determined on the basis of whether or not the RRC layer information indicating the asynchronous HARQ is configured in the terminal device.

(8) In the terminal device according to the present embodiment, regardless of whether or not the RRC layer information indicating the asynchronous HARQ is configured in the terminal device, the synchronous HARQ is always applied to the MAC layer data corresponding to the uplink grant having been received on a physical downlink control channel including CRC parity bits scrambled with the SPS C-RNTI.

(9) The terminal device according to the present embodiment includes a reception unit configured to receive the RRC layer information indicating the asynchronous HARQ, and a transmission unit configured to transmit the MAC layer data in accordance with the uplink grant received on the physical downlink control channel including CRC parity bits scrambled with the C-RNTI. Regardless of whether or not the RRC layer information indicating the asynchronous HARQ is configured, the synchronous HARQ is always applied to the MAC layer data transmission corresponding to the uplink grant received on the physical downlink control channel in a first search space. Whether the synchronous HARQ or the asynchronous HARQ is applied to the MAC layer data transmission corresponding to the uplink grant received on the physical downlink control channel in a second search space is determined on the basis of whether or not the RRC layer information indicating the asynchronous HARQ is configured.

(10) The base station device according to the present embodiment includes a transmission unit configured to transmit the RRC layer information indicating asynchronous HARQ, and a reception unit configured to receive the MAC layer data in accordance with the uplink grant transmitted on the physical downlink control channel including CRC parity bits scrambled with the C-RNTI. Regardless of whether or not the RRC layer information indicating the asynchronous HARQ is configured in the terminal device, the synchronous HARQ is always applied to the MAC layer data transmission corresponding to the uplink grant transmitted on the physical downlink control channel in a first search space. Whether the synchronous HARQ or the asynchronous HARQ is applied to the MAC layer data reception corresponding to the uplink grant transmitted on the physical downlink control channel in a second search space, is determined on the basis of whether or not the RRC layer information indicating the asynchronous HARQ is configured in the terminal device.

(11) In the present embodiment, the first search space is a Common Search Space (CSS), and the second search space is a UE-specific Search Space (USS) given by the C-RNTI.

(12) The terminal device according to the present embodiment includes a reception unit configured to receive the RRC layer information indicating the asynchronous HARQ for a secondary cell, and a first random access response which is a random access response including fields for indicating the uplink grant and the Temporary C-RNTI and is related to the non-contention based random access procedure on the secondary cell; a transmission unit configured to transmit the MAC layer data; and a MAC layer processing unit configured to manage multiple HARQ processes and deliver the uplink grant to a HARQ process which instructs the transmission unit to transmit the MAC layer data in accordance with the uplink grant. In a case that the RRC layer information indicating the asynchronous HARQ is configured, the HARQ process in which the uplink grant included in the first random access response is delivered is determined on the basis of the value of the field for indicating the Temporary C-RNTI included in the first random access response.

(13) In the terminal device according to the present embodiment, in a case that the RRC layer information indicating the asynchronous HARQ is not configured, the HARQ process in which the uplink grant included in the first random access response is delivered is determined on the basis of the subframe in which the first random access response has been received.

(14) In the terminal device according to the present embodiment, the reception unit receives a second random access response related to the contention based random access procedure on the secondary cell; regardless of whether or not the RRC layer information indicating the asynchronous HARQ is configured, the HARQ process in which the uplink grant included in the second random access response is delivered is determined on the basis of the subframe in which the second random access response has been received.

(15) The base station device according to the present embodiment includes: a transmission unit configured to transmit the RRC layer information indicating the asynchronous HARQ for a secondary cell, and a first random access response which is a random access response including fields for indicating the uplink grant and the Temporary C-RNTI and is related to the non-contention based random access procedure on the secondary cell; a reception unit configured to receive the MAC layer data; and a MAC layer processing unit configured to manage multiple HARQ processes. In a case that the RRC layer information indicating the asynchronous HARQ is configured in the terminal device, the value of the field for indicating the Temporary C-RNTI included in the first random access response indicates the HARQ process corresponding to the uplink grant included in the first random access response.

(16) In the base station device according to the present embodiment, in a case that the RRC layer information indicating the asynchronous HARQ is not configured in the terminal device, the HARQ process corresponding to the uplink grant included in the first random access response is associated with the subframe in which the first random access response has been transmitted.

(17) In the base station device according to the present embodiment, the transmission unit transmits a second random access response related to the contention based random access procedure on the secondary cell; regardless of whether or not the RRC layer information indicating the asynchronous HARQ is configured, the HARQ process for the uplink grant included in the second random access response is associated with the subframe in which the second random access response has been transmitted.

(18) The terminal device according to the present embodiment includes a reception unit configured to receive the RRC layer information indicating the asynchronous HARQ, a transmission unit configured to transmit the MAC layer data, and a MAC layer processing unit configured to deliver the uplink grant to the HARQ process that instructs the transmission unit to transmit the MAC layer data in accordance with the uplink grant. Regardless of whether or not the RRC layer information indicating the asynchronous HARQ is configured, the HARQ process in which the uplink grant having been received on the physical downlink control channel including CRC parity bits scrambled with the Temporary C-RNTI is delivered is determined on the basis of the subframe in which the uplink grant has been received on the physical downlink control channel including CRC parity bits scrambled with the Temporary C-RNTI. The HARQ process in which the uplink grant received on the physical downlink control channel including CRC parity bits scrambled with the C-RNTI is delivered is determined on the basis of either the HARQ information received on the physical downlink control channel including CRC parity bits scrambled with the C-RNTI or the subframe in which the uplink grant has been received on the physical downlink control channel including CRC parity bits scrambled with the C-RNTI based on whether or not the RRC layer information indicating the asynchronous HARQ is configured.

(19) In the terminal device according to the present embodiment, regardless of whether or not the RRC layer information indicating the asynchronous HARQ is configured, the HARQ process in which the uplink grant included in the random access response related to the contention based random access procedure is delivered is determined on the basis of a number of the subframe in which the random access response has been received.

(20) In the terminal device according to the present embodiment, the HARQ process to which the uplink grant included in the random access response related to the non-contention based random access procedure is delivered is determined on the basis of whether or not the RRC layer information indicating the asynchronous HARQ is configured, by either the information included in the random access response or the subframe in which the uplink grant has been received on the physical downlink control channel including CRC parity bits scrambled with the C-RNTI.

(21) In the terminal device according to the present embodiment, regardless of whether or not the RRC layer information indicating the asynchronous HARQ is configured, the HARQ process in which the uplink grant received on the physical downlink control channel including CRC parity bits scrambled with the SPS C-RNTI is delivered is determined on the basis of the subframe in which the uplink grant has been received on the physical downlink control channel including CRC parity bits scrambled with the SPS C-RNTI.

(22) The base station device according to the present embodiment includes a transmission unit configured to transmit the RRC layer information indicating the asynchronous HARQ and the uplink grant, a reception unit configured to receive the MAC layer data, and a MAC layer processing unit configured to deliver the uplink grant to the HARQ process that instructs the transmission unit to transmit the MAC layer data in accordance with the uplink grant. Regardless of whether or not the RRC layer information indicating the asynchronous HARQ is configured in the terminal device, the HARQ process for the uplink grant transmitted on the physical downlink control channel including CRC parity bits scrambled with the Temporary C-RNTI is associated with the subframe in which the uplink grant has been transmitted on the physical downlink control channel including CRC parity bits scrambled with the Temporary C-RNTI; and whether the HARQ process in which the uplink grant transmitted on the physical downlink control channel including CRC parity bits scrambled with the C-RNTI is delivered is indicated by the HARQ information transmitted on the physical downlink control channel including CRC parity bits scrambled with the C-RNTI or is associated with the subframe in which the uplink grant has been transmitted on the physical downlink control channel including CRC parity bits scrambled with the C-RNTI is determined on the basis of whether or not the RRC layer information indicating the asynchronous HARQ is configured in the terminal device.

(23) In the base station device according to the present embodiment, regardless of whether or not the RRC layer information indicating the asynchronous HARQ is configured in the terminal device, the HARQ process for the uplink grant included in the random access response related to the contention based random access procedure is associated with the subframe in which the random access response has been transmitted.

(24) In the base station device according to the present embodiment, whether the HARQ process for the uplink grant included in the random access response related to the non-contention based random access procedure is indicated by the information included in the random access response or is associated with the subframe in which the uplink grant has been transmitted on the physical downlink control channel including CRC parity bits scrambled with the C-RNTI is determined on the basis of whether or not the RRC layer information indicating the asynchronous HARQ is configured.

(25) In the base station device according to the present embodiment, regardless of whether or not the RRC layer information indicating the asynchronous HARQ is configured in the terminal device, the HARQ process for the uplink grant having been transmitted on the physical downlink control channel including CRC parity bits scrambled with the SPS C-RNTI is associated with the subframe in which the uplink grant has been transmitted on the physical downlink control channel including CRC parity bits scrambled with the SPS C-RNTI.

(26) The terminal device according to the present embodiment includes a reception unit configured to receive the uplink grant on the physical downlink control channel including CRC parity bits scrambled with the C-RNTI, a transmission unit configured to transmit the MAC layer data, and a MAC layer processing unit configured to deliver the uplink grant to the HARQ process that instructs the transmission unit to transmit the MAC layer data in accordance with the uplink grant. Regardless of whether or not the RRC layer information indicating the asynchronous HARQ is configured, the HARQ process in which the uplink grant received on the physical downlink control channel in a first search space is delivered is determined on the basis of the subframe in which the uplink grant has been received on the physical downlink control channel in the first search space; and the HARQ process in which the uplink grant received on the physical downlink control channel in a second search space is delivered is determined on the basis of whether or not the RRC layer information indicating the asynchronous HARQ is configured, by either the HARQ information received on the physical downlink control channel in the second search space or the subframe in which the uplink grant has been received on the physical downlink control channel in the second search space.

(27) The base station device according to the present embodiment includes a transmission unit configured to transmit the uplink grant on the physical downlink control channel including CRC parity bits scramble with the C-RNTI, a reception unit configured to receive the MAC layer data, and a MAC layer processing unit configured to manage multiple HARQ processes. Regardless of whether or not the RRC layer information indicating the asynchronous HARQ is configured in the terminal device, the HARQ process for the uplink grant transmitted on the physical downlink control channel in a first search space is associated with the subframe in which the uplink grant has been transmitted on the physical downlink control channel in the first search space; and whether the HARQ process for the uplink grant transmitted on the physical downlink control channel in a second search space is indicated by the HARQ information transmitted on the physical downlink control channel in the second search space or is associated with the subframe in which the uplink grant has been transmitted on the physical downlink control channel in the second search space is determined on the basis of whether or not the RRC layer information indicating the asynchronous HARQ is configured in the terminal device.

(28) The terminal device according to the present embodiment includes a reception unit configured to receive an RRC layer parameter indicating the synchronous HARQ or asynchronous HARQ to a secondary cell, a MAC layer processing unit configured to apply the synchronous HARQ or asynchronous HARQ to MAC layer data transmission on the secondary cell on the basis of the RRC layer parameter, and multiple HARQ buffers configured to store the MAC layer data. The HARQ control unit, in a case that the RRC layer parameter is modified/reconfigured/released, flushes a HARQ buffer for the secondary cell, of the multiple HARQ buffers.

(29) The terminal device according to the present embodiment includes a reception unit configured to receive an RRC layer parameter indicating the synchronous HARQ or the asynchronous HARQ to a secondary cell, a MAC layer processing unit configured to apply the synchronous HARQ or asynchronous HARQ to MAC layer data transmission on the secondary cell on the basis of the RRC layer parameter. The MAC layer processing unit manages a HARQ process related to the MAC layer data transmitted on the secondary cell and sets the NDI corresponding to the HARQ process to 0 in a case that the RRC layer parameter is modified/reconfigured.

(30) The terminal device according to the present embodiment includes a reception unit configured to receive the RRC layer parameter indicating the synchronous HARQ or the asynchronous HARQ to a secondary cell, and a MAC layer processing unit configured to apply the synchronous HARQ or asynchronous HARQ to MAC layer data transmission on the secondary cell on the basis of the RRC layer parameter. The MAC layer processing unit manages the HARQ processes related to the MAC layer data transmitted on the secondary cell, and considers, in a case that the RRC layer parameter is modified/reconfigured, the next transmission related to the HARQ process as the initial transmission.

(31) The terminal device according to the present embodiment includes a reception unit configured to receive the RRC layer parameter indicating the synchronous HARQ or the asynchronous HARQ to a secondary cell, and a MAC layer processing unit configured to apply the synchronous HARQ or asynchronous HARQ to MAC layer data transmission on the secondary cell on the basis of the RRC layer parameter. The MAC layer processing unit includes a HARQ entity which manages multiple HARQ processes related to the MAC layer data on the secondary cell, and, in a case that the RRC layer parameter is modified/reconfigured, initializes the HARQ entity.

These configurations allow the terminal device 1 to communicate with the base station device 3 efficiency.

A program running on each of the base station device 3 and the terminal device 1 according to the present invention may be a program that controls a central processing unit (CPU) and the like (a program causing a computer to operate) in such a manner as to realize the functions according to the above-described embodiment of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD) and when necessary, is read out by the CPU to be modified or rewritten.

Moreover, the terminal device 1 and the base station device 3 according to the above-described embodiment may be partially realized by a computer. This configuration may be realized by recording a program for realizing such control functions on a computer-readable recording medium and causing a computer system to read the program recorded on the recording medium for execution.

The "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiment can be realized as an aggregation (a device group) constituted of multiple devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiment can communicate with the base station device as the aggregation.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the terminal device is described as one example of a communication device, but the present invention is not limited thereto, and can be applied to a terminal device or a communication device of a fixed-type or a stationary-type electronic apparatus installed indoors or outdoors, for example, such as an audio-video (AV) apparatus, a kitchen apparatus, a cleaning or washing machine, an air-conditioning apparatus, office equipment, a vending machine, and other household apparatuses.

The embodiment of the present invention has been described in detail above with reference to the drawings, but the specific configuration is not limited to the above embodiment, and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

DESCRIPTION OF REFERENCE NUMERALS 1 (1A, 1B, 1C) Terminal device
3 Base station device
10 Radio transmission/reception unit
11 Antenna unit
12 RF unit
13 Baseband unit
14 Higher layer processing unit
15 Medium Access Control layer processing unit
16 Radio Resource Control layer processing unit
30 Radio transmission/reception unit
31 Antenna unit
32 RF unit
33 Baseband unit
34 Higher layer processing unit
35 Medium Access Control layer processing unit
36 Radio Resource Control layer processing unit

The invention claimed is:

1. A terminal device comprising:
reception circuitry configured to and/or programmed to perform a reception of an uplink grant included in a control channel or a random access response; and
transmission circuitry configured to and/or programmed to perform a transmission based on the uplink grant;
wherein, the control channel includes hybrid automatic repeat request (HARQ) information, and the random access response without a HARQ process identifier (ID),
in asynchronous HARQ, a HARQ process which corresponds to the transmission is associated with a HARQ process ID which is included in the HARQ information except in a case where the uplink grant is included in the random access response, and
for the transmission associated with the uplink grant included in the random access response, a HARQ process ID is used.

2. A base station device comprising:
transmission circuitry configured to and/or programmed to perform a transmission of an uplink grant included in a control channel or a random access response; and
reception circuitry configured to and/or programmed to perform a reception based on the uplink grant,
wherein, the control channel includes hybrid automatic repeat request (HARQ) information, and random access response without a HARQ process identifier (ID),
in asynchronous HARQ, a HARQ process which corresponds to the transmission is associated with a HARQ process ID which is included in the HARQ information except in a case where the uplink grant is included in the random access response, and
for the transmission associated with the uplink grant included in the random access response, a HARQ process ID is used.

3. A communication method for terminal device, the communication method comprising:
performing a reception of an uplink grant included in a control channel or a random access response; and
performing a transmission based on the uplink grant;
wherein, the control channel includes hybrid automatic repeat request (HARQ) information, and the random access reposne without a HARQ process identifier (ID),
in asynchronous HARQ, a HARQ process which corresponds to the transmission is associated with a HARQ process ID which is included in the HARQ information except in a case where the uplink grant is included in the random access response, and
for the transmission associated with the uplink grant included in the random access response, a HARQ process ID is used.

4. A communication method for base station device, the communication method comprising:
performing a transmission of an uplink grant included in a control channel or a random access response; and
performing a reception based on the uplink grant,
wherein, the control channel includes hybrid automatic repeat request (HARQ) information, and the random access response without a HARQ process identifier (ID),
in asynchronous HARQ, a HARQ process which corresponds to the transmission is associated with a HARQ process ID which is included in the HARQ information except in a case where the uplink grant is included in the random access response, and
for the transmission associated with the uplink grant included in the random access response, a HARQ process ID is used.

5. The terminal device according to claim 1, wherein the random access response is associated with non-contention based random access procedure.

6. The base station device according to claim 2, wherein the random access response is associated with non-contention based random access procedure.

* * * * *